(12) United States Patent
Wada

(10) Patent No.: US 10,230,867 B2
(45) Date of Patent: Mar. 12, 2019

(54) IMAGE PROCESSING APPARATUS, RECTANGLE REGION DETECTION METHOD, AND COMPUTER-READABLE, NON-TRANSITORY MEDIUM

(71) Applicant: PFU LIMITED, Kahoku-shi, Ishikawa (JP)

(72) Inventor: Tomoaki Wada, Kahoku (JP)

(73) Assignee: PFU LIMITED, Kahoku-Shi, Ishikawa (JP)

(*) Notice: Subject to any disclaimer, the term of this patent is extended or adjusted under 35 U.S.C. 154(b) by 4 days.

(21) Appl. No.: 15/496,911

(22) Filed: Apr. 25, 2017

(65) Prior Publication Data
US 2018/0176408 A1 Jun. 21, 2018

(30) Foreign Application Priority Data
Dec. 19, 2016 (JP) .................................. 2016-245778

(51) Int. Cl.
*H04N 1/32* (2006.01)
*G06T 7/13* (2017.01)
(Continued)

(52) U.S. Cl.
CPC ............ *H04N 1/3224* (2013.01); *G06K 9/00* (2013.01); *G06T 3/403* (2013.01); *G06T 7/13* (2017.01);
(Continued)

(58) Field of Classification Search
CPC .. G06T 3/403; G06T 7/13; H04N 1/04; H04N 1/107; H04N 1/3224; H04N 1/32689
See application file for complete search history.

(56) References Cited

U.S. PATENT DOCUMENTS 5,144,132 A * 9/1992 Kitakado ............. G01N 21/956
 250/208.1
5,764,788 A * 6/1998 Barnes ...................... G06T 7/12
 382/108
(Continued)

FOREIGN PATENT DOCUMENTS

JP 2009/171218 7/2009
JP 2013-58937 A 3/2013
(Continued)

OTHER PUBLICATIONS

Japanese Office Action dated Feb. 19, 2018 regarding Japanese Patent Application No. 2016-245778 corresponding to U.S. Appl. No. 15/496,911 (3 pages) with English Translation (3 pages).

*Primary Examiner* — Mekonen T Bekele
(74) *Attorney, Agent, or Firm* — Lewis Roca Rothgerber Christie LLP

(57) ABSTRACT

An image processing apparatus includes an edge pixel extractor for extracting an edge pixel from an input image, an end pixel extractor for extracting an end pixel in the input image, an edge pixel addition module for adding the end pixel extracted by the end pixel extractor as an edge pixel based on a pixel value of a pixel located within a first range from the end pixel, a straight line extractor for extracting straight lines from the edge pixel extracted by the edge pixel extractor and the end pixel added as an edge pixel by the edge pixel addition module, and a rectangle region detector for detecting a rectangle region from the extracted straight lines.

7 Claims, 25 Drawing Sheets

(51) Int. Cl.
*H04N 1/04* (2006.01)
*H04N 1/107* (2006.01)
*G06T 3/40* (2006.01)
*G06K 9/00* (2006.01)

(52) U.S. Cl.
CPC .............. *H04N 1/04* (2013.01); *H04N 1/107* (2013.01); *H04N 1/32689* (2013.01)

(56) References Cited

U.S. PATENT DOCUMENTS

| | | | | |
|---|---|---|---|---|
| 9,848,104 | B1* | 12/2017 | Wada | G06T 3/608 |
| 2009/0252420 | A1* | 10/2009 | Sakurai | G06K 9/00798 |
| | | | | 382/202 |
| 2010/0053410 | A1* | 3/2010 | Yoshii | G06K 9/3216 |
| | | | | 348/333.11 |
| 2010/0149603 | A1* | 6/2010 | Maeda | H04N 1/00681 |
| | | | | 358/449 |
| 2011/0025860 | A1* | 2/2011 | Katougi | G06T 3/4069 |
| | | | | 348/207.2 |
| 2011/0032570 | A1* | 2/2011 | Imaizumi | H04N 1/387 |
| | | | | 358/1.15 |
| 2013/0027402 | A1* | 1/2013 | Iskenderian | G06T 11/40 |
| | | | | 345/440 |
| 2013/0063788 | A1 | 3/2013 | Iwayama et al. | |
| 2013/0121595 | A1 | 5/2013 | Kawatani et al. | |
| 2014/0126811 | A1* | 5/2014 | Ihara | G06K 9/4604 |
| | | | | 382/165 |
| 2014/0294303 | A1* | 10/2014 | Kawatani | G06T 7/0083 |
| | | | | 382/180 |
| 2015/0117787 | A1* | 4/2015 | Chaudhury | G06T 7/80 |
| | | | | 382/199 |
| 2015/0220804 | A1* | 8/2015 | Parfenov | G06K 9/4638 |
| | | | | 348/199 |
| 2015/0256696 | A1* | 9/2015 | Wada | H04N 1/00005 |
| | | | | 358/448 |
| 2017/0366705 | A1* | 12/2017 | Wada | G06T 3/608 |

FOREIGN PATENT DOCUMENTS

| | | |
|---|---|---|
| JP | 2013-106160 A | 5/2013 |
| JP | 2013-179409 | 9/2013 |
| JP | 2013-179410 | 9/2013 |

* cited by examiner

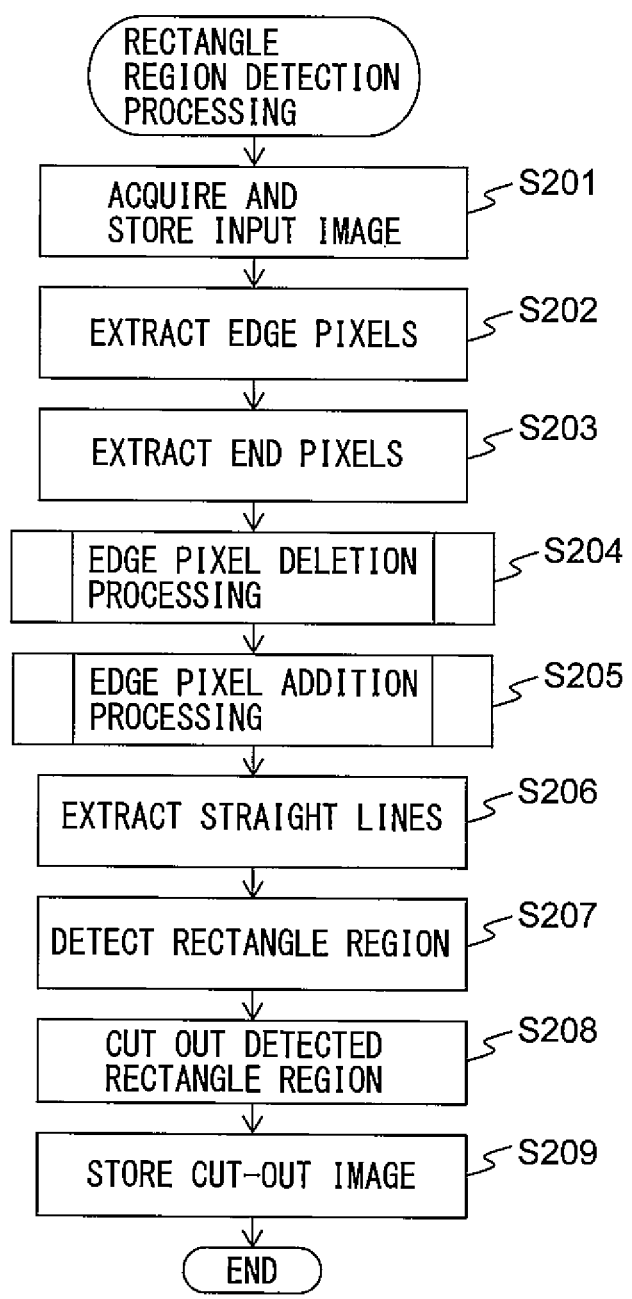

IMAGE PROCESSING APPARATUS, RECTANGLE REGION DETECTION METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2016-245778, filed on Dec. 19, 2016, the entire contents of which are incorporated herein by reference.

TECHNICAL FIELD

Embodiments discussed in the present specification relate to detect a rectangle region from an image.

BACKGROUND

To read a document using an image processing apparatus such as a scanner and store the document as image data, it may be preferable to accurately detect a document region from the read image. In general, a flat-bed scanner identifies a document region and the remaining region from each other using a backing having a monochromatic color such as white or black. However, when, for example, a document bound in book form, a stapled document, or a document too voluminous to feed by an ADF (Auto Document Feeder) is read, the user may read the document while a cover for the scanner is open to shorten the operation time. When the document is read while the cover is open, no backing is used so that illumination etc., may be captured in a region capturing no document in the read image data, thus hindering accurate detection of a document region. In recent years, a technique for preventing detection of an incorrect document region is under development.

An information processing apparatus which detects a rectangle region from an input image is disclosed. The information processing apparatus extracts edge pixels from the input image, extracts straight lines from the extracted edge pixels, and extracts rectangle region candidates formed by each straight line. The information processing apparatus selects a rectangle region from the rectangle region candidates based on the number of edge pixels located within a prescribed distance from each side of each rectangle region candidate, and the likelihood of being a corner of each corner of each rectangle region candidate (see Japanese Laid-open Patent Publication No. 2013-106160).

A scanner which determines a document region in a read image is disclosed. The scanner determines whether any edge line on which edge pixels continuously align themselves is present in an end region between the position of the end side of a read image and that of the end side of a press member, in the read image. When it is determined that such an edge line is present in the end region, the scanner determines the edge line as one side of a document region that is a region of a document image itself. When it is determined that such an edge line is absent in the end region, the scanner determines as one side of a document region, an edge line located at the position of the end side of the press member or the position more to the center of the read image than the position of this end side (see Japanese Laid-open Patent Publication No. 2013-179410).

An image processing apparatus which detects an edge defining a document region from image data obtained by reading a document, suffering from flares, is disclosed. The image processing apparatus detects candidates for edge points defining the boundary line of a document region from image data including the document region in two ways, and determines a candidate located at internal side of the document region as an edge point (see Japanese Laid-open Patent Publication No. 2013-58937).

A scanner which determines a document region in a read image is disclosed. The scanner detects from a read image, an edge line on which edge pixels align themselves in the direction in which the angular difference from the boundary line between a platen glass and an underframe is equal to or larger than a prescribed value. When an endpoint for the edge line is located on the boundary line, the scanner determines the end point of the edge line as a point on one side of the document region; otherwise, it determines an endpoint for an edge line closest to the boundary line as a point on one side of the document region (see Japanese Laid-open Patent Publication No. 2013-179409).

SUMMARY

An image processing apparatus such as a flat-bed scanner may preferably more accurately detect a rectangle region in which an image of a document is to be cut out from a read input image.

It is an object to provide an image processing apparatus and a rectangle region detection method which can accurately detect a rectangle region from an input image, and a computer program for causing a computer to execute such a rectangle region detection method.

According to an aspect of the apparatus, there is provided an image processing apparatus. The image processing apparatus includes an edge pixel extractor for extracting an edge pixel from an input image, an end pixel extractor for extracting an end pixel in the input image, an edge pixel addition module for adding the end pixel extracted by the end pixel extractor as an edge pixel based on a pixel value of a pixel located within a first range from the end pixel, a straight line extractor for extracting straight lines from the edge pixel extracted by the edge pixel extractor and the end pixel added as an edge pixel by the edge pixel addition module, and a rectangle region detector for detecting a rectangle region from the extracted straight lines.

According to an aspect of the method, there is provided a rectangle region detection method executed by an image processing apparatus. The rectangle region detection method includes extracting an edge pixel from an input image, extracting an end pixel in the input image, adding the extracted end pixel as an edge pixel based on a pixel value of a pixel located within a first range from the end pixel, extracting straight lines from the extracted edge pixel and the end pixel added as an edge pixel, and detecting, using a computer, a rectangle region from the extracted straight lines.

According to an aspect of the computer-readable, non-transitory medium storing a computer program, the computer program causes a computer to execute a process, including extracting an edge pixel from an input image, extracting an end pixel in the input image, adding the extracted end pixel as an edge pixel based on a pixel value of a pixel located within a first range from the end pixel, extracting straight lines from the extracted edge pixel and the end pixel added as an edge pixel, and detecting a rectangle region from the extracted straight lines.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF THE DRAWINGS

FIG. 7 is a flowchart illustrating the operation of rectangle region detection processing.

DESCRIPTION OF EMBODIMENTS

Hereinafter, an image processing apparatus, a rectangle region detection method and a computer program according to an embodiment, will be described with reference to the drawings. However, it should be noted that the technical scope of the invention is not limited to these embodiments, and extends to the inventions described in the claims and their equivalents.

Figure 1:
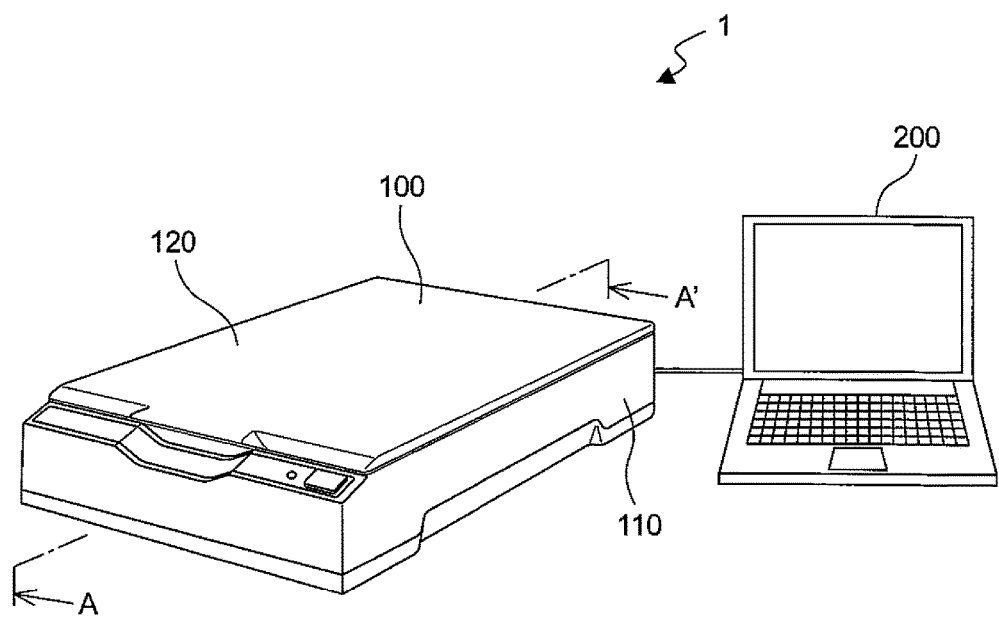
FIG. 1 is a diagram illustrating an image processing system 1 according to an embodiment.

FIG. 1 is a diagram illustrating an image processing system according to an embodiment. An image processing system 1 includes an image reading apparatus 100 and an information processing apparatus 200, as depicted as FIG. 1. Referring to FIG. 1, the image reading apparatus 100 is illustrated in a perspective view.

The image reading apparatus 100 is implemented in, for example, a flat-bed scanner. The image reading apparatus 100 includes, for example, a housing 110 and a cover 120 and is connected to the information processing apparatus 200. The information processing apparatus 200 is an example of an image processing apparatus, such as a personal computer.

Figure 2:
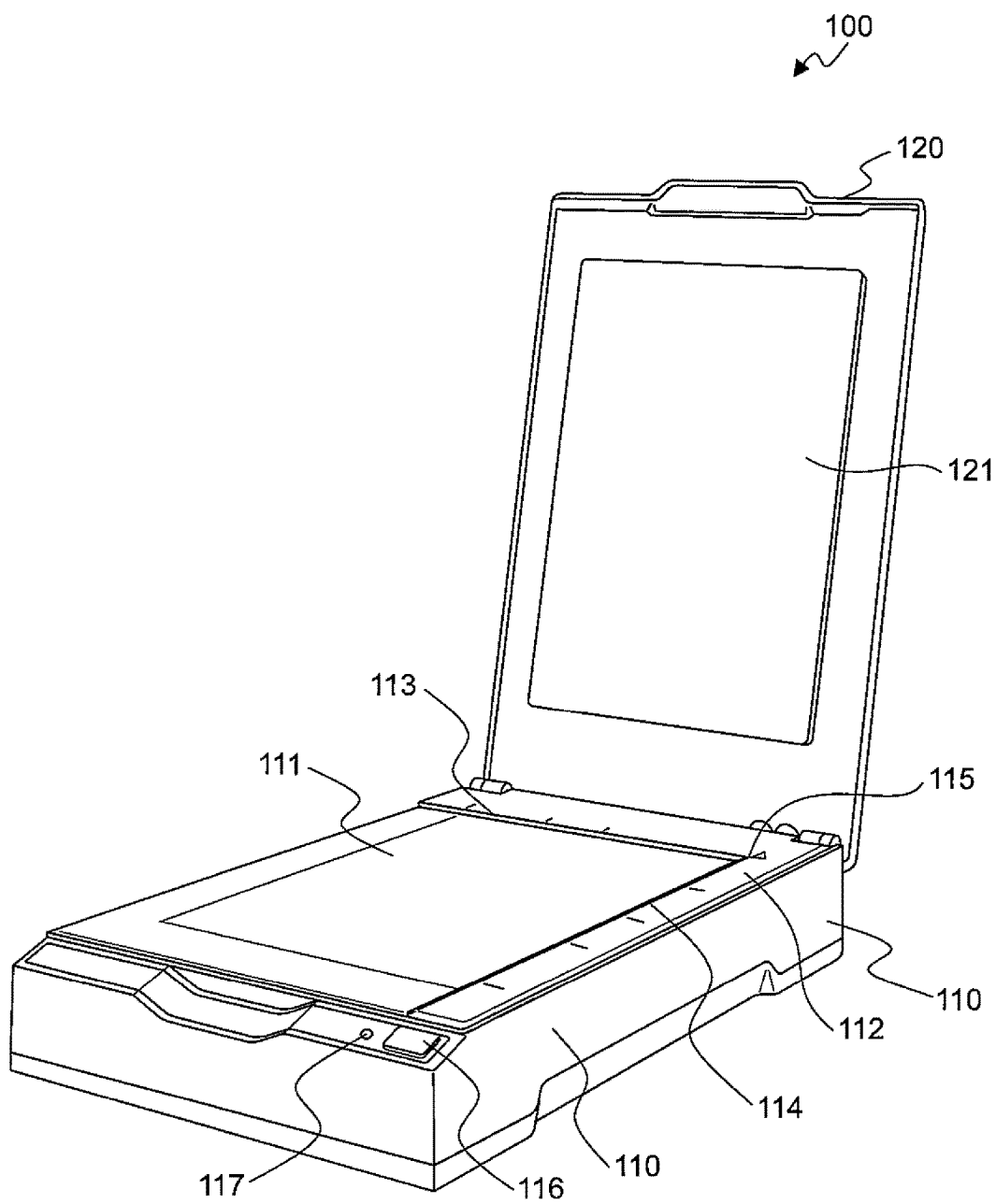
FIG. 2 is a perspective view of an image reading apparatus 100 while a cover 120 is open.

FIG. 2 is a perspective view of the image reading apparatus 100 while the cover 120 is open.

The housing 110 includes, for example, a glass plate ill, a butting member 112, a first input device 116, and a first display device 117.

The glass plate 111 is a member which supports a document to be read and is provided on the upper surface of the housing 110.

The butting member 112 is a member for positioning a document by abutting two sides (short and long sides) of the four sides of a document when the document is rectangular, and is provided on the upper surface of the housing 110 in contact with the glass plate ill. The butting member 112 includes a first edge 113 for abutting the short side of a document, and a second edge 114 for abutting the long side of the document. The first edge 113 extends in the main scanning direction of the image reading apparatus 100, the second edge 114 extends in the sub-scanning direction of the image reading apparatus 100, and the first edge 113 and the second edge 114 are in contact with each other at a right angle at a corner 115.

The first input device 116 is implemented in an operation button placed on the surface of the housing 110 and generates and outputs an operation detection signal according to the user operation upon pressing.

The first display device 117 is implemented in an LED (Light Emitting Diode) placed on the surface of the housing 110 and is turned on or off using a color corresponding to the state of the image reading apparatus 100.

The cover 120 includes a backing member 121. The cover 120 is openable and closable with respect to the housing 110, such that a document can be mounted on the upper surface of the housing 110 while the cover 120 is open and the backing member 121 provided in the lower portion (in the housing 110) of the glass plate 111 is opposed to an imaging unit while the cover 120 is closed.

The backing member 121 is provided on the lower surface of the cover 120 to be detachable with respect to the cover 120. A backing member 121 having a color (for example, white or black) identifiable from the background color of a document is placed by the user to enable identification between a document region and the remaining region in an image obtained by reading the document by the image reading apparatus 100.

Figure 3:
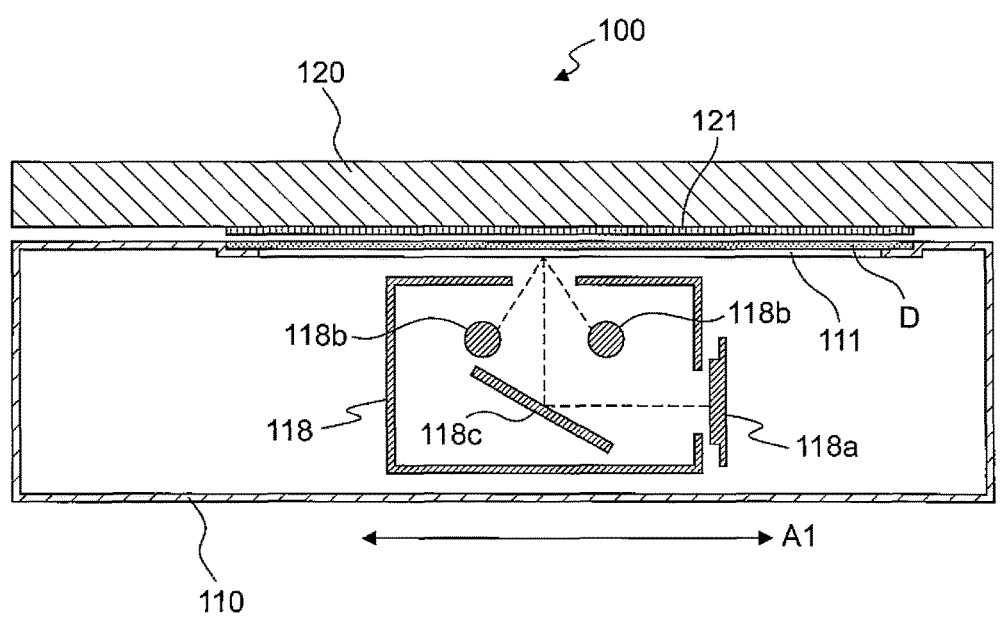
FIG. 3 is a sectional view of the image reading apparatus 100 while the cover 120 is closed.

FIG. 3 is a sectional view of the image reading apparatus 100 while the cover 120 is closed, taken along a line A-A' in FIG. 1.

The housing 110 includes an imaging unit 118, as illustrated as FIG. 3. The imaging unit 118 is opposed to the cover 120 in a closed state and the backing member 121 attached to the cover 120 across the glass plate 111. The imaging unit 118 extends to be capable of capturing an image from one end to the other end of the glass plate 111 in a direction (main scanning direction) which is parallel to the glass plate 111 and perpendicular to the direction indicated by an arrow A1 in FIG. 3. The imaging unit 118 is movably set to be capable of capturing an image from one end to the other end of the glass plate 111 in the direction (sub-scanning direction) indicated by the arrow A1 in FIG. 3.

The imaging unit 118 includes, for example, an imaging device 118a, an illumination device 118b, and a mirror 118c.

The imaging device 118a is an example of an image reading device. The imaging device 118a includes a reduction optical system image sensor including image sensing elements as CCDs (Charge Coupled Devices) linearly arranged in the main scanning direction. The image sensor captures a document D mounted on the glass plate 111 and generates and outputs analog image signals corresponding to R, G, and B colors, respectively. In place of CCDs, a unit magnification optical system CIS (Contact Image Sensor) including image sensing elements as CMOSs (Complementary Metal Oxide Semiconductors) may be used.

The illumination device 118b includes a light source which illuminates a document, and is opposed to the glass plate 111. Light emitted by the illumination device 118b is reflected by the document D mounted on the glass plate 111 and forms an image on the image sensing elements of the imaging device 118a via the mirror 118c.

Figure 4:
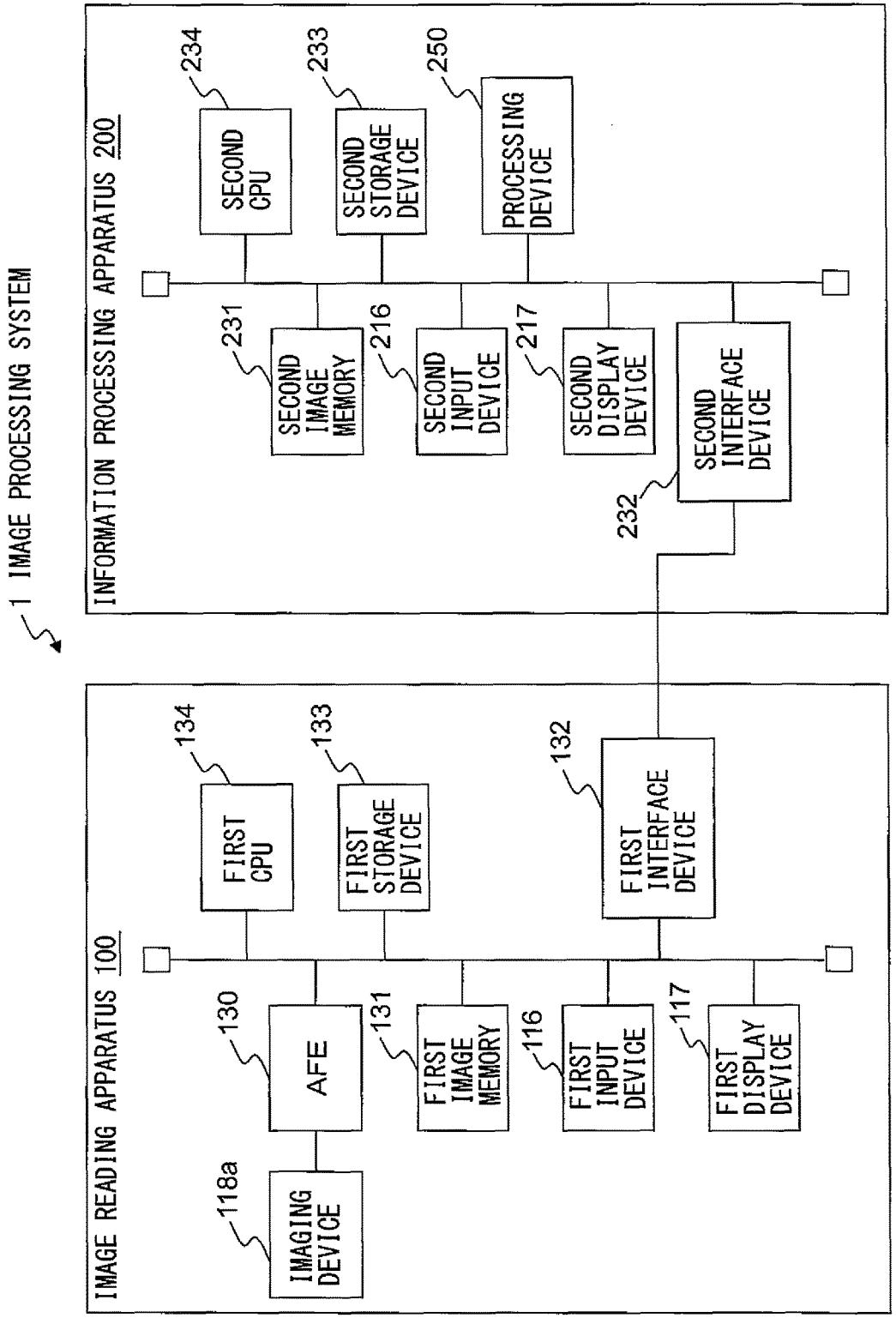
FIG. 4 is a diagram illustrating the schematic configuration of the image processing system 1.

FIG. 4 is a diagram illustrating the schematic configuration of the image processing system 1.

The image reading apparatus 100 includes an AFE (Analog Front End) 130, a first image memory 131, a first interface device 132, a first storage device 133, and a first CPU (Control Processing Unit) 134, in addition to the above-described configuration.

The AFE 130 converts each analog value output from the imaging device 118a into a digital value to generate pixel data, and generates image data (to be referred to as an RGB image hereinafter) formed by each generated pixel data. The RGB image is, for example, color image data including pixel data each defined by an RGB value with a total of 24 bits: 8 bits to represent each of R, G, and B colors. The AFE 130 generates a luminance image by converting the RGB value of each pixel in an RGB image into a luminance value and a color difference value (YUV value) and stores the luminance image in the first image memory 131 as an input image. The AFE 130 may store the RGB image in the first image memory 131 as an input image. The YUV value can be calculated as, for example:

$$Y \text{ Value} = 0.30 \times R \text{ Value} + 0.59 \times G \text{ Value} + 0.11 \times B \text{ Value} \quad (1)$$

$$U \text{ Value} = -0.17 \times R \text{ Value} - 0.33 \times G \text{ Value} + 0.50 \times B \text{ Value} \quad (2)$$

$$V \text{ Value} = 0.50 \times R \text{ Value} - 0.42 \times G \text{ Value} - 0.08 \times B \text{ Value} \quad (3)$$

The first image memory 131 includes a storage device such as a nonvolatile semiconductor memory, a volatile semiconductor memory, or a magnetic disk. The first image memory 131 stores an input image generated by the AFE 130.

The first interface device 132 includes an interface circuit compatible with a serial bus such as USB (Universal Serial Bus) and is electrically connected to the information processing apparatus 20 to transmit and receive image data and various kinds of information. Instead of the first interface device 132, a communication device having an antenna for transmitting and receiving a wireless signal and a wireless communication interface circuit for transmitting and receiving a signal via a wireless communication circuit in accordance with a predetermined communication protocol may be used. The predetermined communication protocol may be, for example, a wireless LAN (Local Area Network).

The first storage device 133 includes a memory device such as a RAM (Random Access Memory), a ROM (Read Only Memory), a fixed disk device such as a hard disk or a portable storage device such as a flexible disk, an optical disc, or the like. Computer programs, databases, tables etc., which are used for various kinds of processing by the image reading apparatus 10 are stored in the first storage device 133. Further, the first storage device 133 stores a computer program, a database, a table, etc., that are used for various processing of the image reading apparatus 10. The computer program may be installed on the first storage device 133 from a computer-readable, non-transitory medium such as a compact disk read only memory (CD-ROM), a digital versatile disk read only memory (DVD-ROM), or the like by using a well-known setup program or the like.

The first CPU 134 operates based on a program stored in the first storage 133 in advance. Alternatively, a DSP (digital signal processor), an LSI (large scale integration), etc., may be used instead of the first CPU 134. As another alternative, an ASIC (Application Specific Integrated Circuit), an FPGA (Field-Programming Gate Array), etc., may be used instead of the first CPU 134.

The first CPU 134 is connected to, for example, the first input device 116, the first display device 117, the imaging device 118a, the AFE 130, the first image memory 131, the first interface device 132, and the first storage device 133 and controls each of these modules. The first CPU 134 performs, for example, document reading control of the imaging device 118a and control of data exchange with the information processing apparatus 200 via the first interface device 132.

The information processing apparatus 200 includes a second input device 216, a second display device 217, a second image memory 231, a second interface device 232, a second storage device 233, a second CPU 234, and a processing device 250. Each module of the information processing apparatus 200 will be described in detail below.

The second input device 216 includes an input device such as a keyboard, a mouse or the like and an interface circuit acquiring signals from the input device and outputs a signal responsive to a user's operation to the second CPU 234.

The second display device 217 includes a display formed by a liquid-crystal display, an organic electroluminescence display or the like and an interface circuit which outputs image data to the display, and is connected to the second image memory 231 to display image data stored in the second image memory 231 on the display.

The second image memory 231 includes a storage device similar to that of the first image memory 131 of the image reading apparatus 10. The second image memory 231 stores a read image received from the image reading apparatus 10 through the second interface device 232 and is connected to the processing device 250 to store various processed images resulting from image processing of input images by the processing device 250.

The second interface device 232 includes an interface circuit similar to that of the first interface device 132 of the image reading apparatus 100 and interconnects the information processing apparatus 200 and the image reading apparatus 100. Instead of the second interface device 232, a communication device having an antenna for transmitting and receiving a wireless signal and a wireless communication interface circuit for transmitting and receiving a signal via a wireless communication circuit in accordance with a predetermined communication protocol such as a wireless LAN or the like may be used.

The second storage device 233 includes a memory device, a fixed disk device, a portable storage device or the like that is similar to that of the first storage device 133 of the image reading apparatus 100. The second storage device 233 stores computer programs, databases, tables etc., used in various kinds of processing by the information processing apparatus 200. Further, the second storage device 233 stores a computer program, a database, a table, etc., that are used for various processing of the information processing apparatus 200. The computer program may be installed on the second storage device 233 from a computer-readable, non-transitory medium such as a CD-ROM, a DVD-ROM, or the like by using a well-known setup program or the like.

The second storage device 233 stores the error tolerances of the document reading position of the image reading apparatus 100 that captures an input image. The second storage device 233 stores the error tolerance occurring in each individual apparatus and the error tolerance occurring in each document reading process, as the error tolerances of the document reading position of the image reading apparatus 100.

The second storage device 233 stores the value (for example, 2 to 3 mm) of an offset error related to image reading defined in the image reading apparatus 100, as the error tolerance occurring in each individual apparatus. The offset error is the sum of manufacturing tolerances of respective components of the image reading apparatus 100, and the offset error related to image reading is the sum of manufacturing tolerances of respective components related to image reading, such as the imaging device 118a, the illumination device 118b, the mirror 118c, and the butting member 112. The manufacturing tolerance represents the accuracy of an actual value after manufacture that depends on, for example, variations or errors with respect to an ideal design value related to, for example, the position and direction of each component, and is set within the range in which normal conditions are expected even when the actual value after manufacture deviates from a theoretical value in the image reading apparatus 100.

The image reading apparatus 100 is designed such that the input image captures, at its ends, a position on the glass plate 111 in contact with the first edge 113 and the second edge 114 of the butting member 112 and does not capture the first edge 113 and the second edge 114. However, the first edge 113 or the second edge 114 may be captured within a distance corresponding to the offset error from the end in the input image. In contrast to this, even when the end of the document is in contact with the first edge 113 and the second edge 114, the first edge 113 or the second edge 114 may not be captured in the input image within a distance corresponding to the offset error from the end in the input image.

The second storage device 233 stores a sub-scanning magnification defined in the image reading apparatus 100, as the error tolerance occurring in each document reading process. The sub-scanning magnification is the allowable magnification (for example, ±1%) of an image which expands or contracts due to variations in speed at which the imaging unit 118 moves mainly in the sub-scanning direction. The second storage device 233 stores use environmental conditions such as the magnitude of vibration which may occur in the image reading apparatus 100, as the error tolerance occurring in each document reading process.

The second CPU 234 operates based on a program stored in the second storage 233 in advance. Alternatively, a DSP, an LSI, an ASIC, an FPGA, etc., may be used instead of the second CPU 234.

The second CPU 234 is connected to, for example, the second input device 216, the second display device 217, the second image memory 231, the second interface device 232, the second storage device 233, and the processing device 250 and controls each of these modules. The second CPU 234 performs, for example, control of data exchange with the image reading apparatus 100 via the second interface device 232, input control of the second input device 216, display control of the second display device 217, and control of image processing by the processing device 250.

The second CPU 234 operates based on a program stored in the second storage 233 in advance. Alternatively, a DSP, an LSI, an ASIC, an FPGA, etc., may be used instead of the second CPU 234.

The processing device 250 is connected to the second image memory 231 and performs rectangle region detection processing. The processing device 250 is connected to the second CPU 234 and operates based on a program, stored in the second storage device 233 in advance, under the control of the second CPU 234. The processing device 250 is implemented in, for example, a CPU, a DSP, an LSI, an ASIC, or an FPGA. The processing device 250 may be implemented in, for example, an independent integrated circuit, microprocessor, or firmware.

Figure 5:
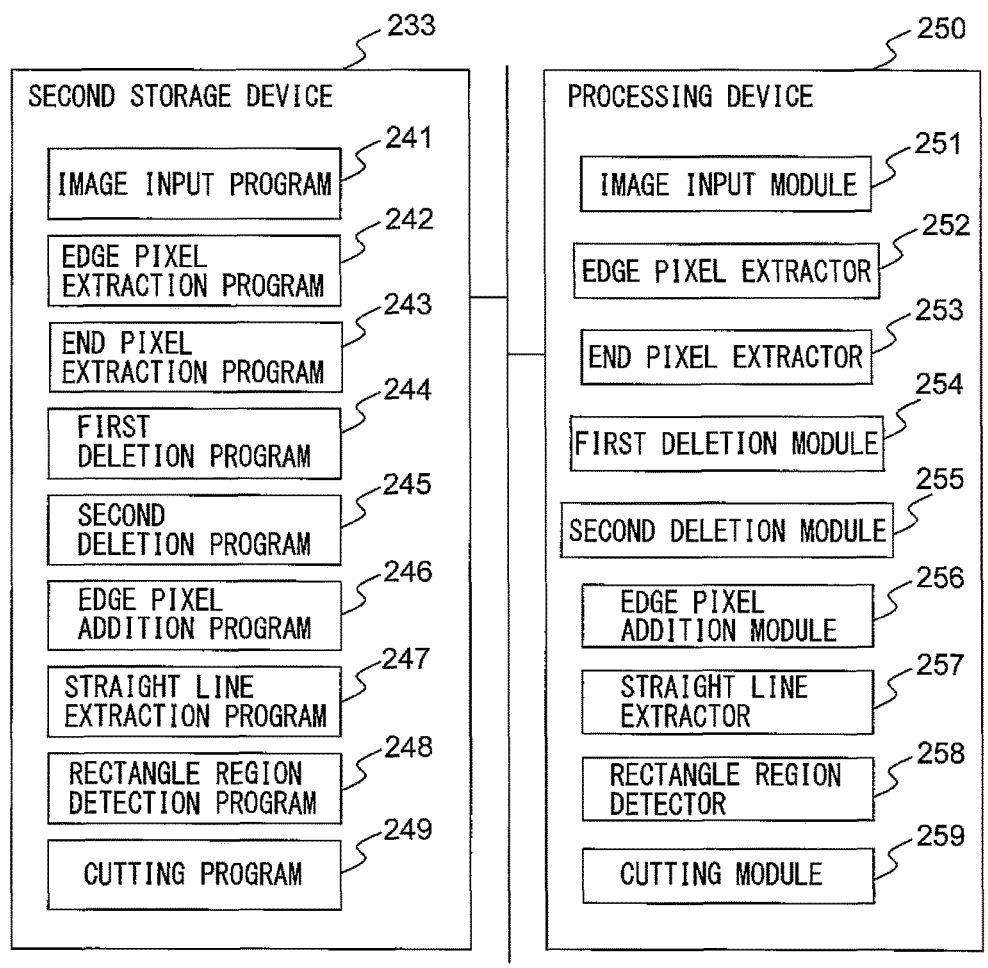
FIG. 5 is a diagram illustrating the schematic configurations of a second storage device 233 and a processing device 250.

FIG. 5 is a diagram illustrating the schematic configurations of the second storage device 233 and the processing device 250.

The second storage device 233 stores each program such as an image input program 241, an edge pixel extraction program 242, an end pixel extraction program 243, a first deletion program 244, a second deletion program 245, an edge pixel addition program 246, a straight line extraction program 247, a rectangle region detection program 248, and a cutting program 249, as illustrated as FIG. 5. Each of these programs serves as a functional module implemented as software running on the processor. The processing device 250 reads each program stored in the second storage device 233 and operates in accordance with each read program. Thus, the processing device 250 functions as an image input module 251, an edge pixel extractor 252, an end pixel extractor 253, a first deletion module 254, a second deletion module 255, an edge pixel addition module 256, a straight line extractor 257, a rectangle region detector 258, and a cutting module 259.

Figure 6:
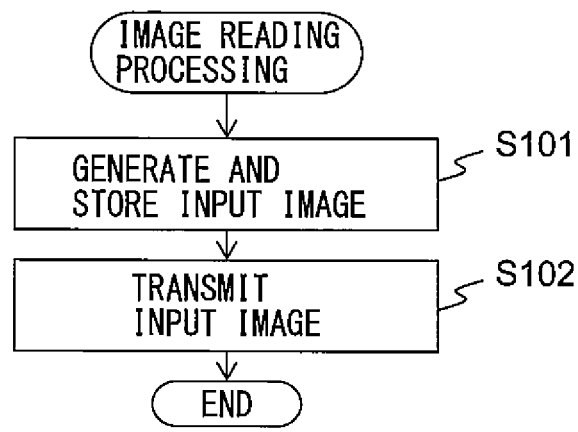
FIG. 6 is a flowchart illustrating the operation of image reading processing.

FIG. 6 is a flowchart illustrating an operation of image reading processing performed by the image reading apparatus 100. The operation of the image reading processing will be described below with reference to the flowchart in FIG. 6. Note that the flow of the operation described below is executed primarily by the first CPU 134 in cooperation with the components of the image reading apparatus 100 in accordance with a program stored in the first storage device 133 beforehand.

First, the imaging device 118a captures a document that is an object to be captured, and the AFE 130 converts each analog value output from the imaging device 118a into a digital value to generate an input image and stores the input image in the first image memory 131 (step S101).

Then the first CPU 134 transmits the input image stored in the first image memory 131 to the information processing apparatus 200 through the first interface device 132 (step S102), then ends the sequence of steps.

FIG. 7 is a flowchart illustrating an operation of rectangle region detection processing performed by the information processing apparatus 200. The operation of the rectangle region detection processing will be described below with reference to the flowchart illustrated in FIG. 7. Note that the flow of the operation described below is executed primarily by the processing device 250 in cooperation with the components of the information processing apparatus 200 in accordance with a program stored in the second storage device 233 beforehand.

First, the image input module 251 acquires an input image from the image reading apparatus 100 through the second interface device 232 and stores the input image in the second image memory 231 (step S201).

The image input module 251 performs thinning processing for thinning out pixels in the horizontal and vertical directions for the acquired input image and then stores the input image in the second image memory 231. In general, since the processing speed of the information processing apparatus 200 considerably varies depending on the number of pixels of an image to be processed, the ratio of pixels to be thinned out is determined in accordance with the processing capacity of the processing device 250 or the like and the processing speed preferable for the information processing apparatus 200. Thinning processing may be omitted when the preferable processing speed is satisfied without thinning out pixels. The ratio of pixels to be thinned may be determined such that random noise contained in the input image is eliminated while halftone areas, texts, etc., in the document are not eliminated.

The edge pixel extractor 252 extracts edge pixels in the horizontal and vertical directions from the input image. The edge pixel extractor 252 generates edge images formed by edge pixels in the horizontal and vertical directions of the input image and stores the edge images in the second image memory 231 (step S202).

The edge pixel extractor 252 calculates an absolute value (to be referred to as a neighboring difference value hereinafter) of the difference in luminance value between pixels horizontally adjacent to a pixel on both sides in the input image, and extracts the pixel in the image as a vertical edge pixel when the neighboring difference value is larger than a threshold value Th1. The threshold value Th1 can be set to, for example, the difference (for example, 20) in luminance value at which a human can visually discern the difference in luminance in the image. The edge pixel extractor 252 performs the same processing in the vertical direction as well for the input image to extract a horizontal edge pixel. The edge pixel extractor 252 generates edge images in the horizontal and vertical directions.

The edge pixel extractor 252 may calculate an absolute value of the difference in luminance value between pixels spaced apart by a prescribed horizontal or vertical distance from a pixel in the input image as a neighboring difference value. The edge pixel extractor 252 may calculate a neighboring difference value using the color value (R, G, or B value) of each pixel in place of the luminance value of each pixel. The edge pixel extractor 252 may extract edge pixels by comparing the luminance value or the color value of the input image with a threshold value. When, for example, the luminance value or the color value of a particular pixel is smaller than a threshold value, and the luminance value or the color value of a pixel neighboring the particular pixel or a pixel spaced apart from the particular pixel by a prescribed distance is equal to or larger than the threshold value, the particular pixel is determined as an edge pixel by the edge pixel extractor 252.

The end pixel extractor 253 extracts and stores end pixels of the input image in the second image memory 231 (step S203). The end pixel extractor 253 extracts as end pixels, a pixel located at the vertical end on the side of the first edge 113 and a pixel located at the horizontal end on the side of the second edge 114 in the input image. The process in step S203 may be executed before the process in step S202.

The first deletion module 254 performs edge pixel deletion processing (step S204). In the edge pixel deletion processing, the first deletion module 254 deletes an edge pixel which is located within a second range from the end pixel and is closest to the end pixel, among the edge pixels extracted by the edge pixel extractor 252. The edge pixel deletion processing will be described in detail later.

The edge pixel addition module 256 performs edge pixel addition processing (step S205). In the edge pixel addition processing, the edge pixel addition module 256 adds the end pixel as an edge pixel based on the pixel value of a pixel located within a first range from the end pixel extracted by the end pixel extractor 253. The edge pixel addition processing will be described in detail later.

The process in step S204 or the process in step S205 may be skipped. The process in step S205 may even be executed before the process in step S204.

The straight line extractor 257 extracts straight lines from edge pixels which are not deleted by the first deletion module 254, among the edge pixels extracted by the edge pixel extractor 252, and the end pixels added as edge pixels by the edge pixel addition module 256 (step S206). The straight line extractor 257 extracts straight lines from each of the horizontal edge image and the vertical edge image. The straight line extractor 257 detects straight lines using Hough transformation. The straight line extractor 257 may detect straight lines using the least squares method. Alternatively, the straight line extractor 257 may detect straight lines using the least squares method for edge pixels located within a prescribed distance from straight lines detected using Hough transformation. The prescribed distance is set as appropriate to, for example, 2 mm, according to the environment or the like, in which the image processing system 1 is used.

The straight line extractor 257 may extract approximate straight lines as straight lines.

Figure 8A:
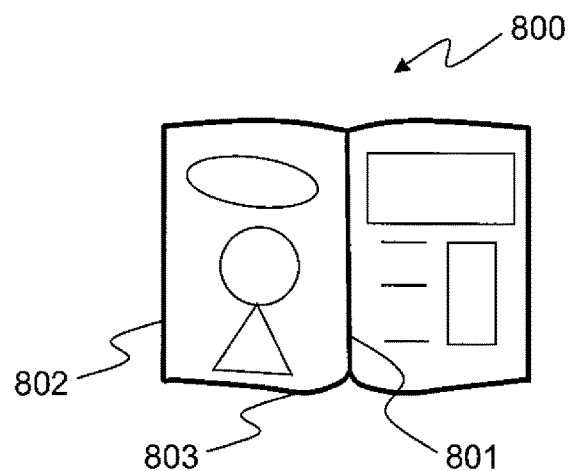
FIG. 8A is a schematic diagram for explaining an approximate straight line.
Figure 8B:
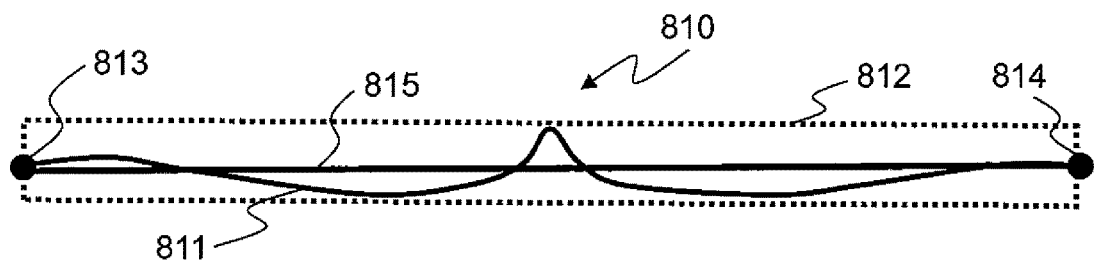
FIG. 8B is a schematic diagram for explaining the approximate straight line.

FIGS. 8A and 8B are schematic diagrams for illustrating approximate straight lines. In a first input image 800 acquired by imaging a book as illustrated in FIG. 8A, an edge 802 parallel to the saddle-stitched portion 801 of the book is detected as a straight line. However, an edge 803 perpendicular to the saddle-stitched portion 801 can distort at a portion near the saddle-stitched portion 801 and therefore may not be detected as a straight line.

To avoid this, the straight line extractor 257 labels adjacent edge pixels 811 to cluster the edge pixels 811 together into a group 812 as illustrated in the edge image 810 in FIG. 8B. The straight line extractor 257 extracts, as an approximate straight line, a straight line 815 that links an edge pixel 813 and an edge pixel 814 that are located at the ends of the group 812 in the horizontal direction or the vertical direction among the edge pixels included in the group 812.

The rectangle region detector 258 detects a rectangle region from the straight lines detected by the straight line extractor 257 (step S207) and ends the sequence of the steps.

The rectangle region detector 258 extracts a plurality of candidate rectangle regions each of which is composed of four straight lines or approximate straight lines which consist of two pairs of the plurality of the straight lines extracted by the straight line extractor 257 intersecting at substantially right angles. The rectangle region detector 258 first selects a horizontal straight line (hereinafter referred to as a first horizontal line) and extracts a horizontal straight line (hereinafter referred to as a second horizontal line) that is substantially parallel (for example within ±3°) to the selected straight line and at a distance greater than or equal to a threshold value Th2 from the selected straight line. The rectangle region detector 258 then extracts a vertical straight line (hereinafter referred to as a first vertical line) that is substantially orthogonal (for example within ±30 from 90°) to the first horizontal line. The rectangle region detector 258 then extracts a vertical straight line (hereinafter referred to as a second vertical line) that is substantially orthogonal to the first horizontal line and at a distance greater than or equal to a threshold value Th3 from the first vertical line. Note that the threshold values Th2 and Th3 are predetermined in accordance with the size of a document to be read by the image reading apparatus 100 and may equal to each other.

The rectangle region detector 258 extracts all combinations of the first horizontal lines, second horizontal lines, first vertical lines, and second vertical lines that satisfy the conditions described above among all of the straight lines extracted by the straight line extractor 257 and extracts rectangle regions each of which is formed by each of the extracted combinations as candidate rectangle regions. The rectangle region detector 258 calculates the areas of the extracted candidate rectangle regions and removes candidate rectangle regions that have areas less than a predetermined value. The rectangle region detector 258 detects a candidate rectangle region that has the largest area among the remaining candidate rectangle regions as a rectangle region. On the other hand, when no candidate rectangle region has been left, the rectangle region detector 258 detects no rectangle region.

Note that the rectangle region detector 258 may calculate the ratio of the number of edge pixels within a predetermined distance (for example a distance equivalent to 2 mm) from each side of each candidate rectangle region to the total number of the pixels within the predetermined distance and may multiply the area of each candidate rectangle region by the ratio to assign a weight to the candidate rectangle region. This enables detection of rectangle regions composed of straight lines that clearly represent the border of the document. Alternatively, the rectangle region detector 258 may calculate, for each candidate rectangle region, a score for each angle of the candidate rectangle region that represents the likelihood of being a corner and may use the score to assign a weight to the area of the candidate rectangle region.

Figure 9:
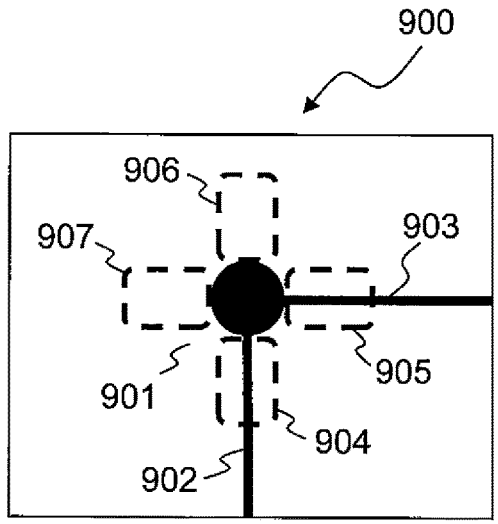
FIG. 9 is a schematic diagram for explaining an evaluation point at each corner of a rectangle region candidate.

FIG. 9 is a schematic diagram for illustrating the score of each corner of a candidate rectangle region. In the image 900 illustrated in FIG. 9, a point 901 represents a corner of a candidate rectangle region and straight lines 902, 903 represent sides of a candidate rectangle region. When ends of the straight lines 902, 903 are in contact with each other, the point 901 is likely to be a corner of a rectangle region. When the ends of the straight lines 902, 903 are not in contact with each other or the straight lines 902, 903 cross each other, the point 901 is unlikely to be a corner of a rectangle region.

The base of the scoring is 0. The rectangle region detector 258 determines whether or not there is an edge pixel in each horizontal line in a region 904 within a predetermined distance from a side 902 near the corner 901. When there is an edge pixel in a horizontal line, 1 is added to the score. The range near each corner and the predetermined distance from each side are chosen as appropriate according to the environment in which the image processing system 1 is used or other factors and may be a range within a distance equivalent to 5 mm from each corner and a distance equivalent to 2 mm from each side, for example. Similarly, the rectangle region detector 258 determines whether or not there is an edge pixel in each vertical line in a region 905 within the predetermined distance from a side 903 near the corner 901. When there is an edge pixel in a vertical line, 1 is added to the score.

Furthermore, the rectangle region detector 258 determines whether or not there is an edge pixel in each horizontal line in a region 906 within the predetermined distance from a line extended from the side 902 near the corner 901. When there is an edge pixel in a horizontal line, 1 is subtracted from the score. Similarly, the rectangle region detector 258 determines whether or not there is an edge pixel in each vertical line in a region 907 within the predetermined distance from a line extended from the side 903 near the corner 901. When there is an edge pixel in a vertical line, 1 is subtracted from the score. The rectangle region detector 258 normalizes the scores so that the lowest possible score is 0 and the highest possible score is 1 and multiplies the area of each candidate rectangle region by the normalized value to assign a weight, thereby the rectangle region detector 258 can detects a rectangle region that clearly represents four corners.

The cutting module 259 cuts out the rectangle region detected by the rectangle region detector 258 from the input image as a document region (step S208).

The cutting module 259 stores the cut-out image in the second image memory 231 or the second storage device 233 (step S209) and ends a series of steps. The image stored in the second image memory 231 or the second storage device 233 is displayed on the second display device 217 in response to a request from the user using the second input device 216.

Figure 10:
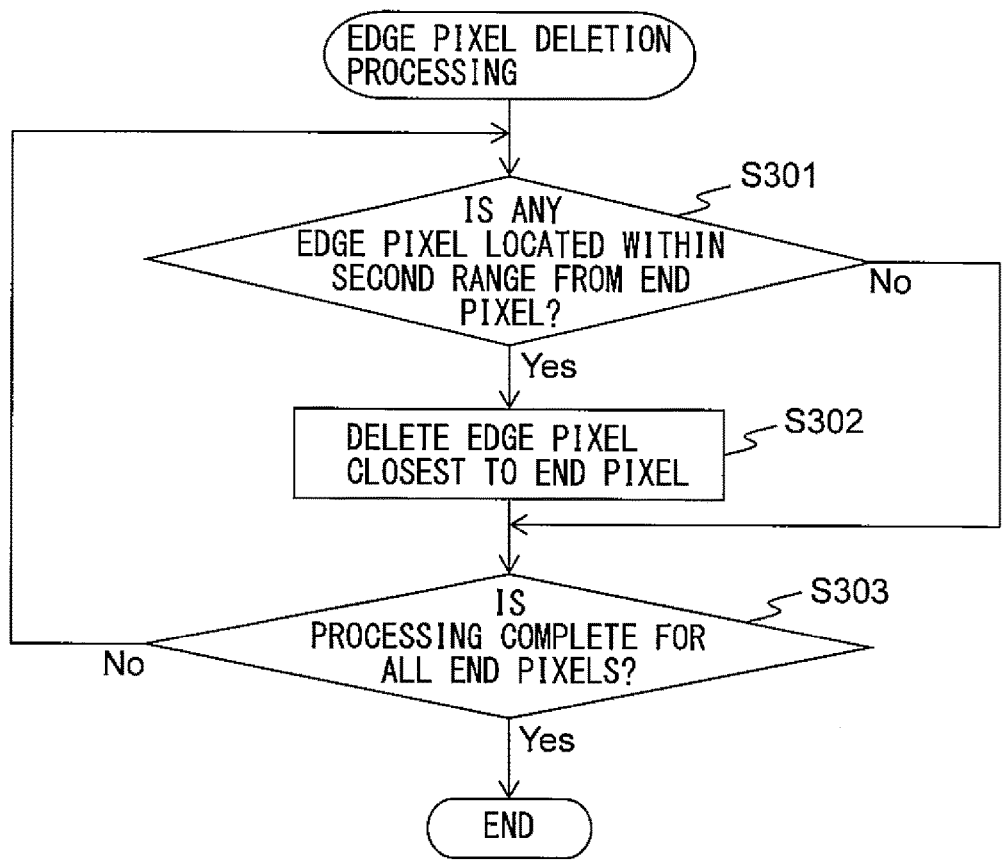
FIG. 10 is a flowchart illustrating an exemplary operation of edge pixel deletion processing.

FIG. 10 is a flowchart illustrating an exemplary operation of edge pixel deletion processing. The operation sequence illustrated in FIG. 10 is executed in step S204 of the flowchart illustrated in FIG. 7. The processes in steps S301 to S303 of FIG. 10 are executed for each end pixel.

The first deletion module 254 first determines whether any edge pixel is located within a second range from the end pixel (step S301). The first deletion module 254 determines whether any edge pixel is located within the second range in the horizontal direction from the end pixel to the interior of the input image, for end pixels corresponding to the horizontal end in the input image. The first deletion module 254 determines whether any edge pixel is located within the second range in the vertical direction from the end pixel to the interior of the input image, for end pixels corresponding to the vertical end in the input image.

The second range is set to a range which may capture the first edge 113 or the second edge 114 in the input image. The second range is determined based on the error tolerance of the document reading position of the image reading apparatus 100. The second range is determined based on, for example, the error tolerance occurring in each individual apparatus, especially the value of an offset error. In this case, the lower limit value of the second range is set to zero, and its upper limit value is set to a distance in the input image corresponding to the value of an offset error. The second range may also be determined based on the error tolerance occurring in each document reading process, especially the sub-scanning magnification or the use environmental conditions. In this case, the lower limit value of the second range is set to zero, and its upper limit value is set to a distance (for example, ±1 pixel) in the input image corresponding to the sub-scanning magnification or the magnitude of vibration which may occur in the image reading apparatus 100. The second range may even be set based on both the error tolerance occurring in each individual apparatus and the error tolerance occurring in each document reading process.

When any edge pixel is located within the second range from the end pixel, the first deletion module 254 regards an edge pixel closest to the end pixel as an edge pixel corresponding to the first edge 113 or the second edge 114 and deletes the edge pixel (step S302). The first deletion module 254 deletes the edge pixel from the edge image generated by the edge pixel extractor 252. When no edge pixel is located within the second range from the end pixel, the first deletion module 254 performs no special processing.

The first deletion module 254 determines whether the processing is complete for all end pixels, i.e., pixels located at the respective horizontal and vertical ends in the input image (step S303). When any end pixel remains to be processed, the first deletion module 254 returns the process to step S301, in which it repeats the processes in steps S301 to S303. When all end pixels have been processed, the first deletion module 254 ends a series of steps.

Figure 11:
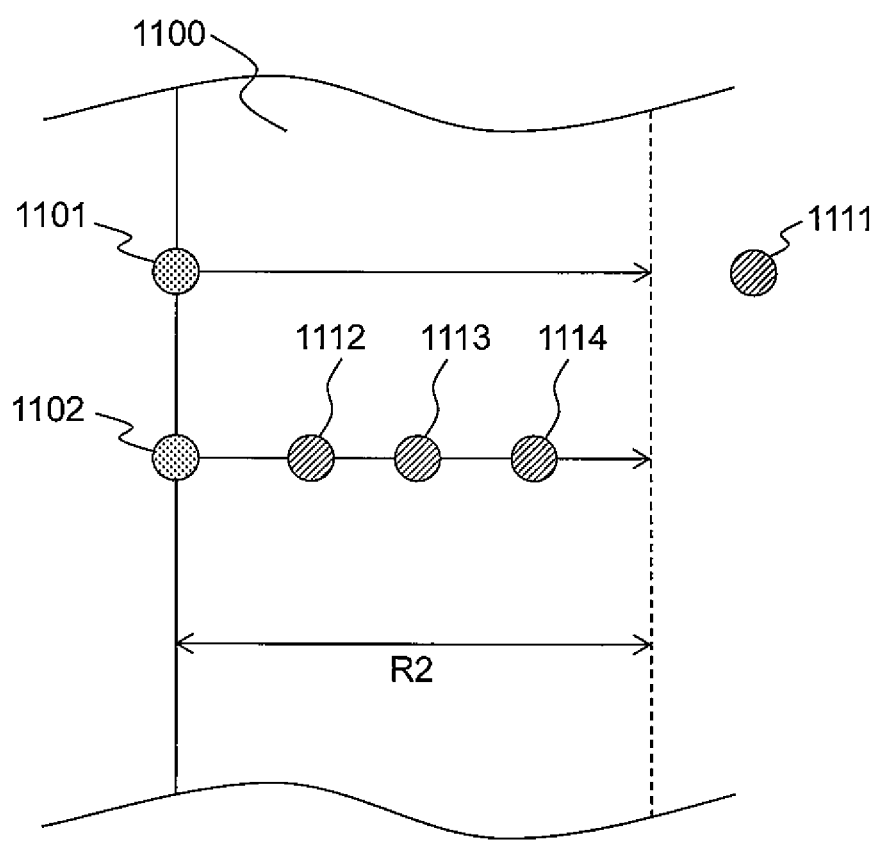
FIG. 11 is a schematic diagram for explaining the edge pixel deletion processing.

FIG. 11 is a schematic diagram for explaining the edge pixel deletion processing.

FIG. 11 represents the left-end region of an input image 1100. The first deletion module 254 performs edge pixel deletion processing for each of end pixels 1101 and 1102 extracted at the left end of the input image 1100. Referring to FIG. 11, a second range R2 is set to the error tolerance of the document reading position of the image reading apparatus 100. For the end pixel 1101, an edge pixel 1111 closest to the end pixel 1101 in the horizontal direction falls outside the second range R2 from the end pixel 1101 and is not deleted. On the other hand, for the end pixel 1102, three edge pixels 1112, 1113, and 1114 are extracted in the second range R2 from the end pixel 1102 in the horizontal direction, and the edge pixel 1112 closest to the end pixel 1102 is deleted.

Figure 12:
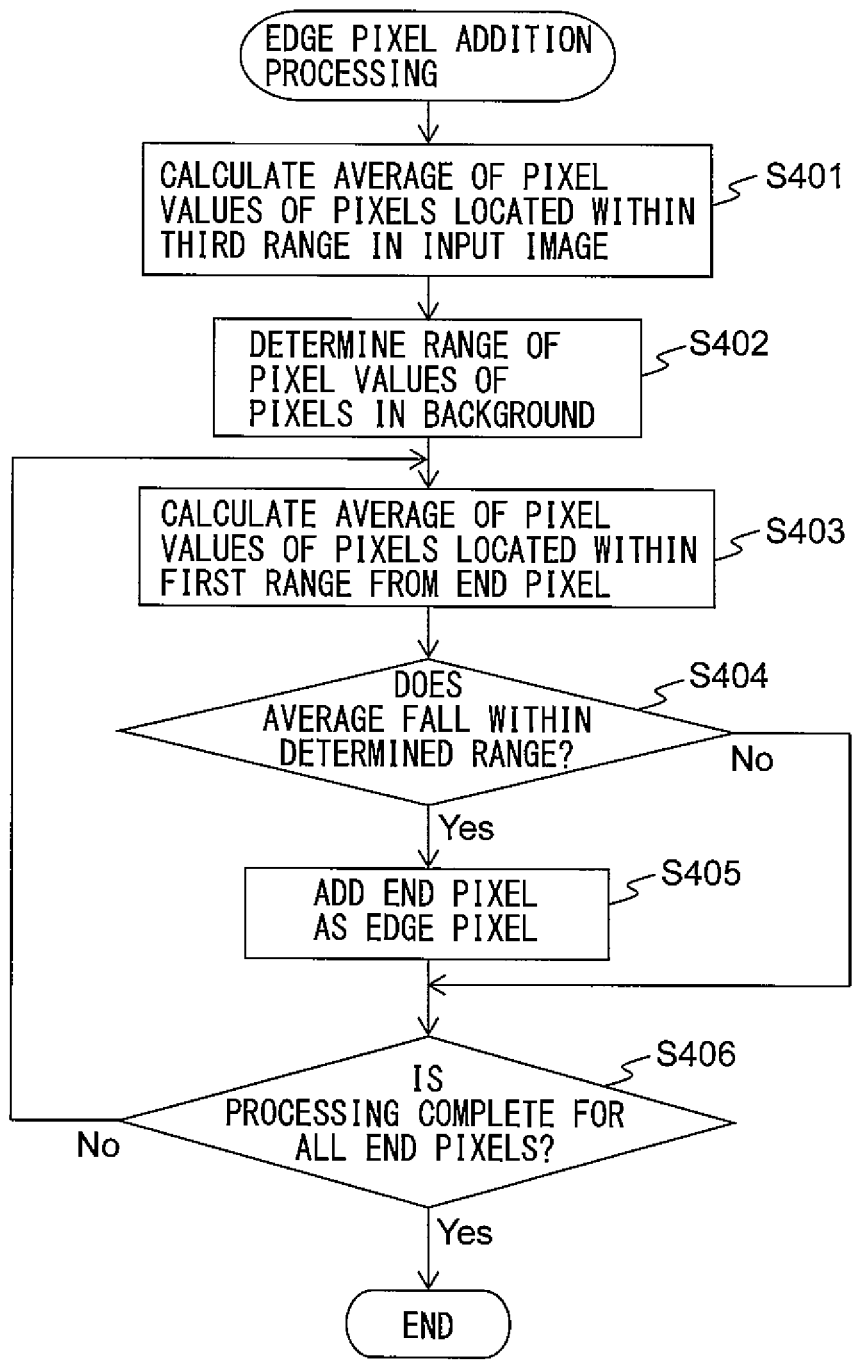
FIG. 12 is a flowchart illustrating an exemplary operation of edge pixel addition processing.

FIG. 12 is a flowchart illustrating an exemplary operation of edge pixel addition processing. The operation sequence illustrated in FIG. 12 is executed in step S205 of the flowchart illustrated in FIG. 7.

The edge pixel addition module 256 first calculates an average of the pixel values of pixels located within a third range in the input image (step S401). The luminance value of each pixel is used as the pixel value when a luminance image is used as the input image, and the color value of each pixel is used as the pixel value when an RGB image is used as the input image.

The third range is set to a region which captures no document and captures the backing member 121 in the input image. The third range is set to a part or the whole of a region capturing no document while two sides of a maximum-size document supported by the image reading apparatus 100 are in contact with the first edge 113 and the second edge 114 of the butting member 112 and a corner formed by the two sides abuts against the corner 115. A pixel located within the third range in the input image is an example of a prescribed pixel.

Figure 13:
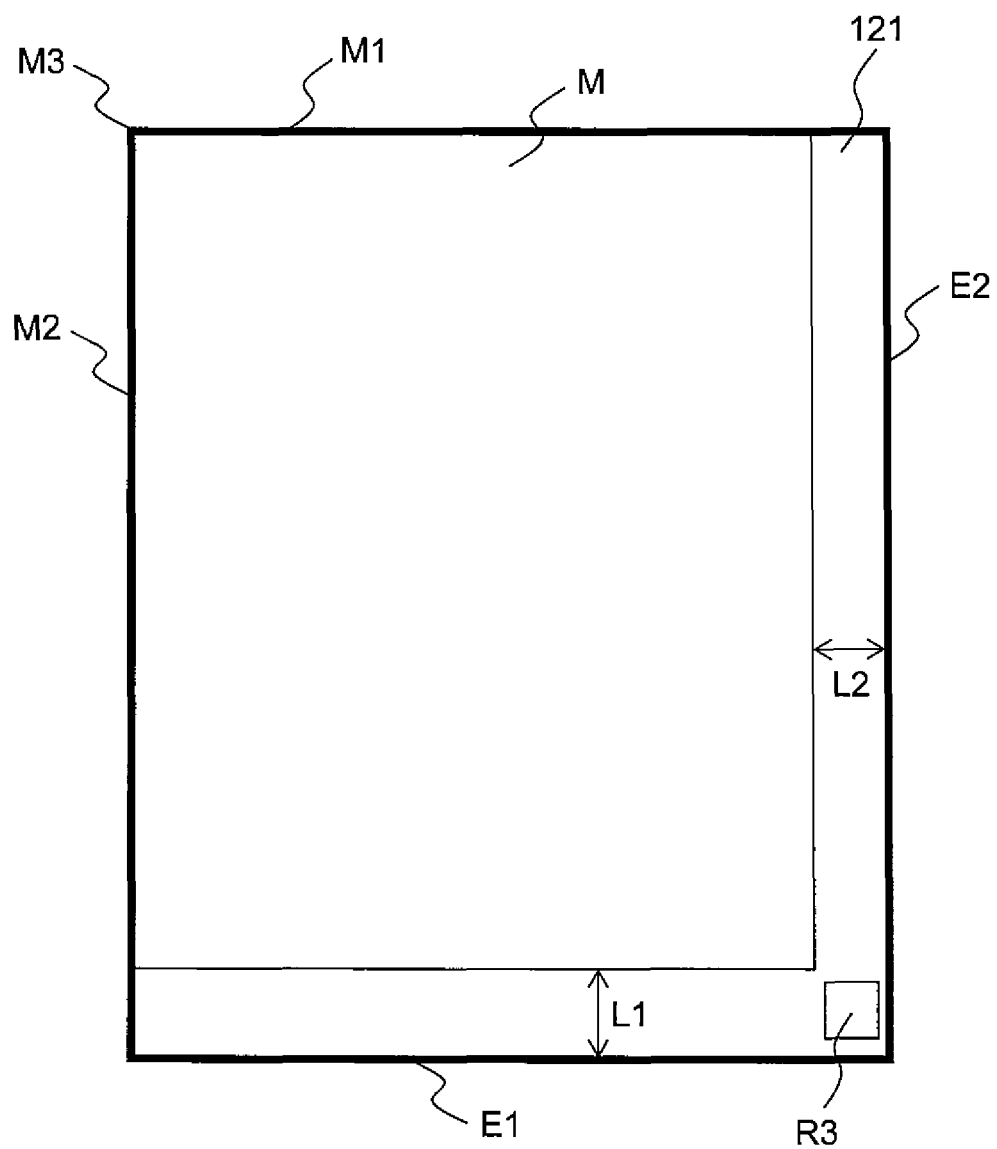
FIG. 13 is a schematic diagram for explaining a third range.

FIG. 13 is a schematic diagram for explaining the third range.

FIG. 13 represents an input image 1300. The input image 1300 is captured while two sides M1 and M2 of a maximum-size document M supported by the image reading apparatus 100 are in contact with the first edge 113 and the second edge 114, respectively, and a corner M3 formed by the two sides M1 and M2 abuts against the corner 115. A third range R3 is set to a part of a region which does not capture the document M in the input image 1300.

In other words, the third range R3 is set to a region within a distance L1 from an end E1 opposite to the first edge 113 or a region within a distance L2 from an end E2 opposite to the second edge 114 in the input image 1300. The distance L1 is set to a value calculated by subtracting the length of one side (long side) of the maximum-size document M supported by the image reading apparatus 100 from the length of the sub-scanning reading range of the imaging device 118a. The distance L2 is set to a value calculated by subtracting the length of one side (short side) of the maximum-size document M supported by the image reading apparatus 100 from the length of the main scanning reading range of the imaging device 118a.

The edge pixel addition module 256 determines the range of pixel values of pixels which capture the background of the document (which do not capture the backing member 121) in the input image (step S402). The range of pixel values of pixels capturing the background of the document is an example of a range determined based on the pixel value of a prescribed pixel in the input image.

For example, when the average of the pixel values of pixels located within the third range is equal to or larger than the median of the range of pixel values which may be taken by pixels in the input image, the edge pixel addition module 256 determines a range equal to or larger than the minimum value of the range and smaller than the median as the range of pixel values of pixels capturing the background of the document. When the average of the pixel values of pixels located within the third range is smaller than the median of the range of pixel values which may be taken by pixels in the input image, the edge pixel addition module 256 determines a range equal to or larger than the median of the range and equal to or smaller than the maximum value as the range of pixel values of pixels capturing the background of the document.

When, for example, a luminance image is used as the input image and the luminance value ranges from 0 to 255, the minimum value is zero, the median is 128, and the maximum value is 255. In the image reading apparatus 100, a backing member 121 having a color (for example, white or black) identifiable from the background color of the document is placed by the user, as described above. When the backing member 121 is white, the average of the pixel values of pixels located within the third range is 128 or more so that the range of 0 (inclusive) to 128 (exclusive) is determined as the range of pixel values of pixels capturing the background of the document. When the backing member 121 is black, the average of the pixel values of pixels located within the third range is less than 128 so that the range of 128 (inclusive) to 255 (inclusive) is determined as the range of pixel values of pixels capturing the background of the document.

The processes in steps S403 to S406 are executed for each end pixel.

The edge pixel addition module 256 calculates an average of the pixel values of pixels located within a first range from the end pixel in the input image (step S403). The luminance value of each pixel is used as the pixel value when a luminance image is used as the input image, and the color value of each pixel is used as the pixel value when an RGB image is used as the input image. The edge pixel addition module 256 calculates an average of the pixel values of pixels located within the first range in the horizontal direction from the end pixel to the interior of the input image, for end pixels corresponding to the horizontal end in the input image. The edge pixel addition module 256 calculates an average of the pixel values of pixels located within the first range in the vertical direction from the end pixel to the interior of the input image, for end pixels corresponding to the vertical end in the input image.

The first range is set to a range which captures the background of the document without the possibility that the input image may capture the first edge 113 or the second edge 114. The first range is determined based on the error tolerance of the document reading position of the image reading apparatus 100, like the second range. The first range is determined based on, for example, the error tolerance occurring in each individual apparatus, especially the value of an offset error. In this case, the lower limit value of the first range is set to a distance in the input image corresponding to the value of an offset error. The first range may also be determined based on the error tolerance occurring in each document reading process, especially the sub-scanning magnification or the use environmental conditions. In this case, the lower limit value of the first range is set to a distance in the input image corresponding to the sub-scanning magnification or the magnitude of vibration which may occur in the image reading apparatus 100. The first range may even be set based on both the error tolerance occurring in each individual apparatus and the error tolerance occurring in each document reading process.

The end of the document is often edged by 1 DTP point. The lower limit value of the first range may be set to a value calculated by adding a distance in the input image corresponding to 1 DTP point (1/72 inches) to each of the above-mentioned values.

The upper limit value of the first range is set based on the range in which a margin is set in the general document. The upper limit value of the first range is set to, for example, a distance in the input image corresponding to the distances (((12±1)+(6±0.5)×½) mm) from the end to two binding holes, specified by the Japanese Industrial Standards. Alternatively, the upper limit value of the first range may be set to a distance in the input image corresponding to the distances ({(6.5±0.5)+(6±0.5)×½} mm) from the end to multiple binding holes, specified by the Japanese Industrial Standards. In the general document, a margin is more likely to be set so as not to print texts, ruled lines, graphics, or the like at the positions of binding holes. Therefore, a region which is more likely to capture the background of the document can be set as the first range by setting the upper limit value of the first range based on the positions of binding holes.

The upper limit value of the first range may even be set to a distance in the input image corresponding to the width (for example, 3 mm from the end) of a non-print region for the general laser printer. Thus, a region which is not printed in the document can be more reliably set as the first range.

It suffices to define the first range between the above-mentioned lower limit value and upper limit value. Separate first ranges may be set. By setting first ranges, even when ruled lines or the like fall within some of the ranges, the error of determining that the backing member 121 is captured in the first range can be reduced.

The edge pixel addition module 256 determines whether the average of the pixel values of pixels located within the first range from the end pixel falls within the range of pixel values of pixels capturing the background of the document (step S404). When first ranges are set for one end pixel, the edge pixel addition module 256 determines whether all the averages in the respective ranges fall within the range of pixel values of pixels capturing the background of the document.

When the average of the pixel values of pixels located within the first range from the end pixel falls within the range of pixel values of pixels capturing the background of the document, the edge pixel addition module 256 regards the document as being captured up to the end of the input image. In this case, assuming that the end of the document is not captured at the end of the input image, the edge pixel addition module 256 adds the end pixel as an edge pixel (step S405). The edge pixel addition module 256 adds the end pixel as an edge pixel in the edge image generated by the edge pixel extractor 252. When the average of the pixel values of pixels located within the first range from the end pixel falls outside the range of pixel values of pixels capturing the background of the document, the edge pixel addition module 256 performs no special processing.

The edge pixel addition module 256 determines whether the processing is complete for all end pixels, i.e., pixels located at the respective horizontal and vertical ends in the input image (step S406). When any end pixel remains to be processed, the edge pixel addition module 256 returns the process to step S403, in which it repeats the processes in steps S403 to S406. When all end pixels have been processed, the edge pixel addition module 256 ends a series of steps.

Figure 14:
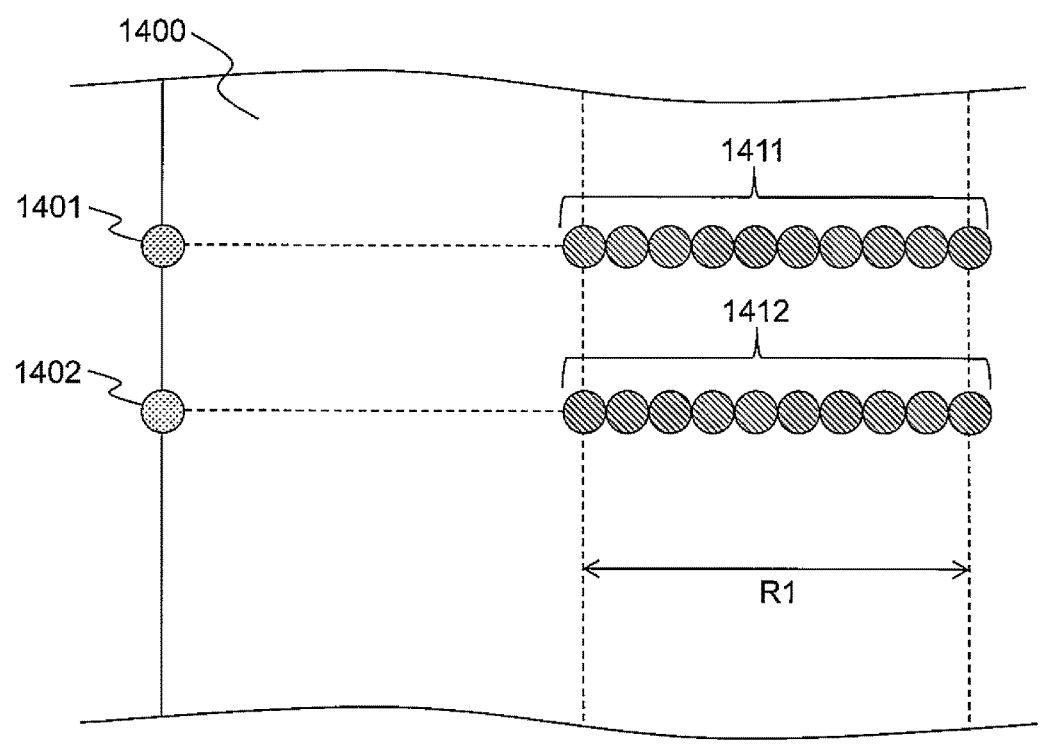
FIG. 14 is a schematic diagram for explaining the edge pixel addition processing.

FIG. 14 is a schematic diagram for explaining the edge pixel addition processing.

FIG. 14 represents the left-end region of an input image 1400. The edge pixel addition module 256 performs edge pixel addition processing for each of end pixels 1401 and 1402 extracted at the left end of the input image 1400. Referring to FIG. 14, the left end of a first range R1 is set to the upper limit of the error tolerance of the document reading position of the image reading apparatus 100, and the right end of the first range R1 is set to the upper limit of the range in which a margin is set in the general document. For the end pixel 1401, when the average of the pixel values of pixels 1411 located within the first range R1 falls within the range of pixel values of pixels capturing the background of the document, the end pixel 1401 is added as an edge pixel. Similarly, for the end pixel 1402, when the average of the pixel values of pixels 1412 located within the first range R1 falls within the range of pixel values of pixels capturing the background of the document, the end pixel 1402 is added as an edge pixel.

The meaning of edge pixel deletion processing and edge pixel addition processing will be described below. As described above, the image reading apparatus 100 is designed such that the input image captures, at its ends, a position on the glass plate 111 in contact with the first edge 113 and the second edge 114 of the butting member 112 and does not capture the first edge 113 and the second edge 114. However, since an error may occur in document reading region of the image reading apparatus 100, the input image may capture the first edge 113 or the second edge 114 and may not capture the end of the document.

Figure 15A:
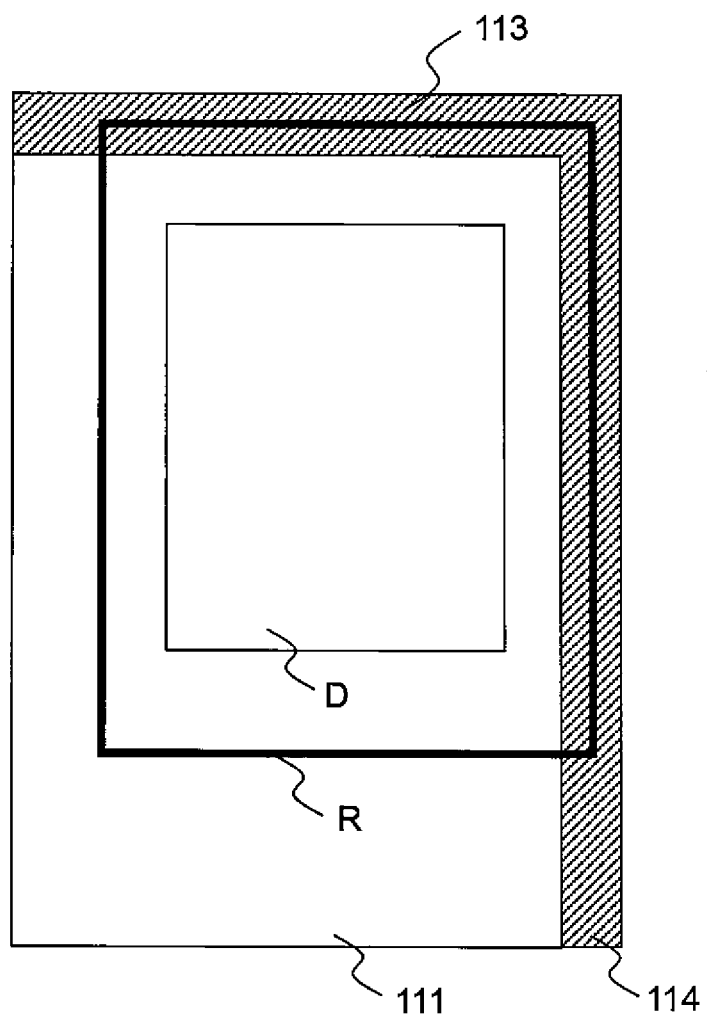
FIG. 15A is a schematic view of a glass plate 111 as viewed from above.
Figure 15B:
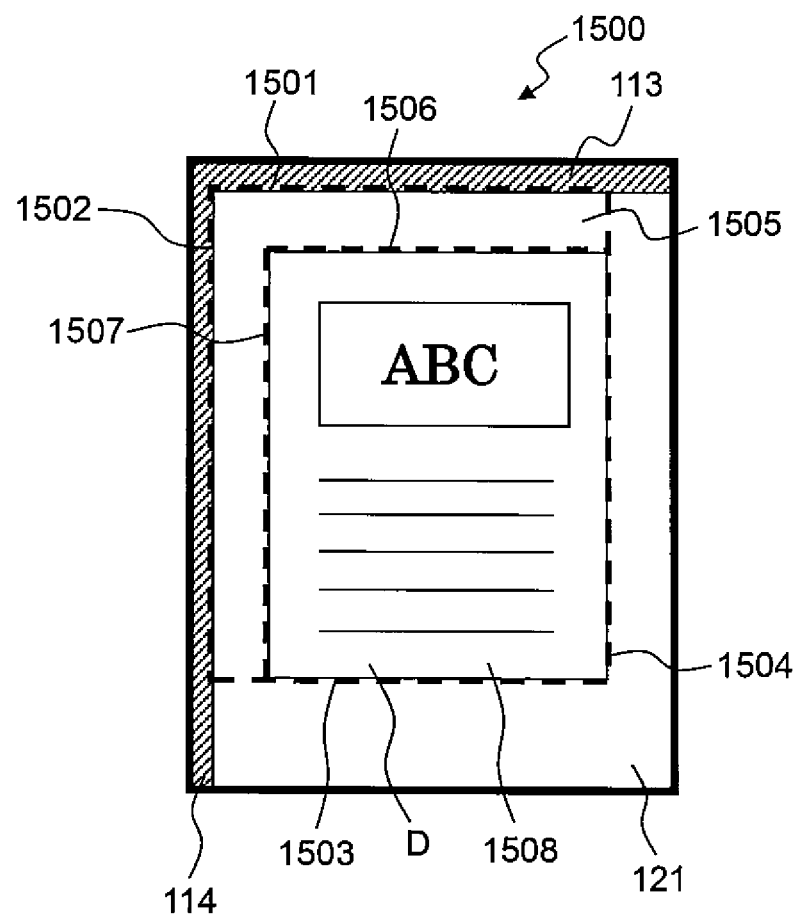
FIG. 15B is a schematic view illustrating an input image 1500.

FIG. 15A is a schematic view of the glass plate 111, as viewed from above, when a reading region R of the imaging device 118a is shifted to the first edge 113 and the second edge 114 and a document D is mounted on the glass plate 111 without contact with the first edge 113 and the second edge 114. FIG. 15B is a schematic view illustrating an input image 1500 captured in the state depicted in FIG. 15A.

In the example illustrated in FIGS. 15A and 15B, the input image 1500 captures the first edge 113 and the second edge 114. When no edge pixel deletion processing is performed, edge pixels defined on the first edge 113 and the second edge 114 are extracted. As a result, a rectangle region 1505 formed by a straight line 1501 defined by the first edge 113, a straight line 1502 defined by the second edge 114, a straight line 1503 defined by the lower end of the document D, and a straight line 1504 defined by the right end of the document D is cut out as a document region. In this case, an image of the backing member 121 is included in the document region.

Edge pixel deletion processing is performed for the input image 1500 to delete edge pixels defined on the first edge 113 and the second edge 114 and located within the second range of the input image 1500. Further, since the backing member 121 is captured in the first range of the input image 1500, no edge pixel is added even when edge pixel addition processing is performed. A straight line 1501 defined by the first edge 113 and a straight line 1502 defined by the second edge 114 are not extracted. As a result, a rectangle region 1508 formed by a straight line 1506 defined by the upper end of the document D, a straight line 1507 defined by the left end of the document D, a straight line 1503 defined by the lower end of the document D, and a straight line 1504 defined by the right end of the document D is suitably cut out as a document region.

In this manner, the information processing apparatus 200 can perform edge pixel deletion processing to appropriately cut out a region capturing the document in the input image even when the input image captures the first edge 113 and the second edge 114 of the backing member 121.

Figure 16A:
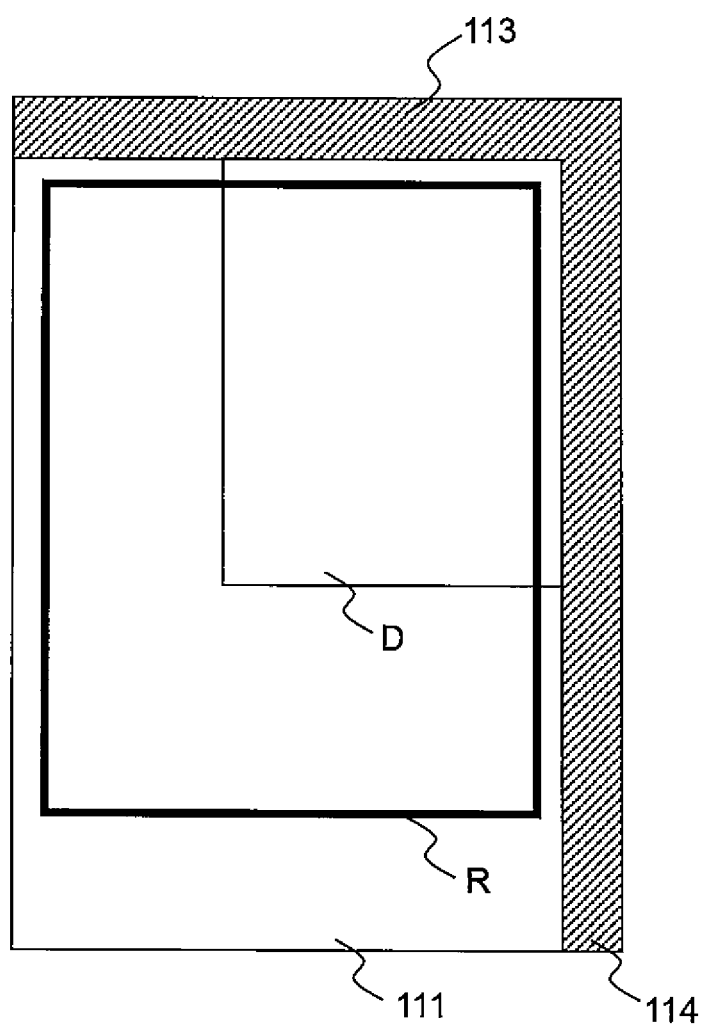
FIG. 16A is a schematic view of a glass plate 111 as viewed from above.
Figure 16B:
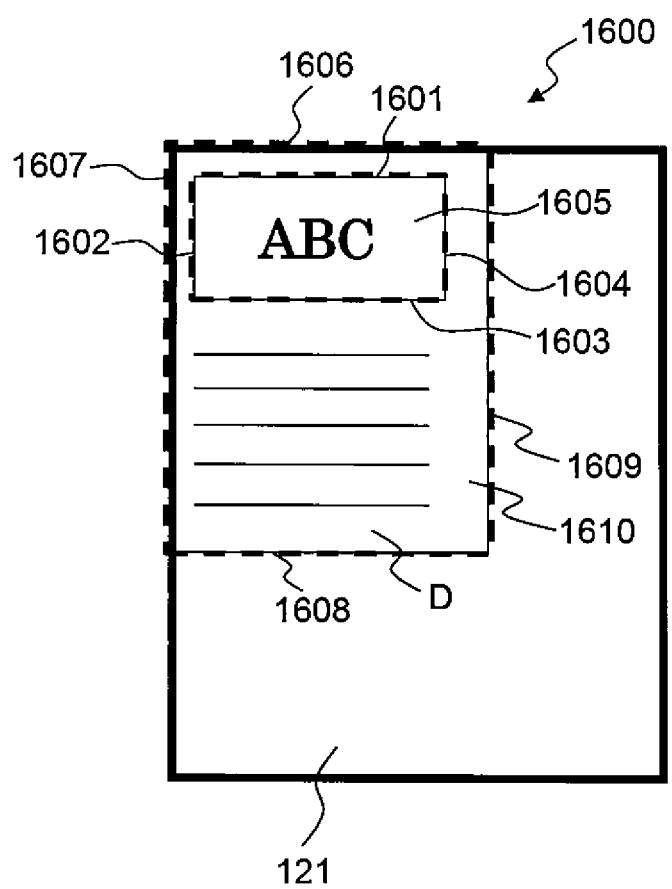
FIG. 16B is a schematic view illustrating an input image 1600.

FIG. 16A is a schematic view of the glass plate 111, as viewed from above, when the reading region R of the imaging device 118a is shifted to the side opposite to the first edge 113 and the second edge 114 and the document D is mounted on the glass plate 111 in contact with the first edge 113 and the second edge 114. FIG. 16B is a schematic view illustrating an input image 1600 captured in the state depicted in FIG. 16A.

In the example illustrated in FIGS. 16A and 16B, the input image 1600 does not capture the upper end and the left end of the document D. When no edge pixel addition processing is performed, no edge pixels defined at the upper end and the left end of the document D are extracted. As a result, a rectangle region 1605 formed by straight lines 1601, 1602, 1603, and 1604 defined by ruled lines in the document D is cut out as a document region.

Since no edge pixel is located within the second range of the input image 1600, no edge pixel is deleted even when edge pixel deletion processing is performed for the input image 1600. Further, since the background of the document D is captured in the first range of the input image 1600, end pixels defined at the upper end and the left end of the input image 1600 are added as edge pixels by edge pixel addition processing. A straight line 1606 defined by the upper end of the input image 1600 and a straight line 1607 defined by the left end of the input image 1600 are extracted. As a result, a rectangle region 1610 formed by a straight line 1606 defined by the upper end of the input image 1600, a straight line 1607 defined by the left end of the input image 1600, a straight line 1608 defined by the lower end of the document D, and a straight line 1609 defined by the right end of the document D is suitably cut out as a document region.

In this manner, the information processing apparatus 200 may perform edge pixel addition processing to cut out the entire document captured in the input image as a document region even when the input image does not capture the end of the document.

Figure 17A:
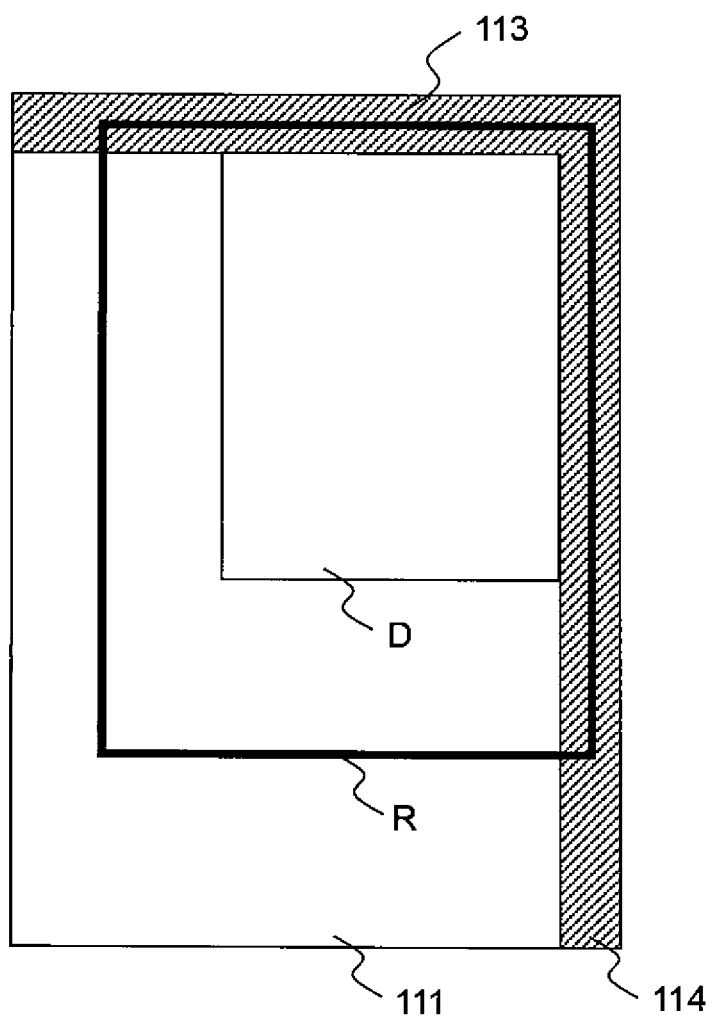
FIG. 17A is a schematic view of a glass plate 111 as viewed from above.
Figure 17B:
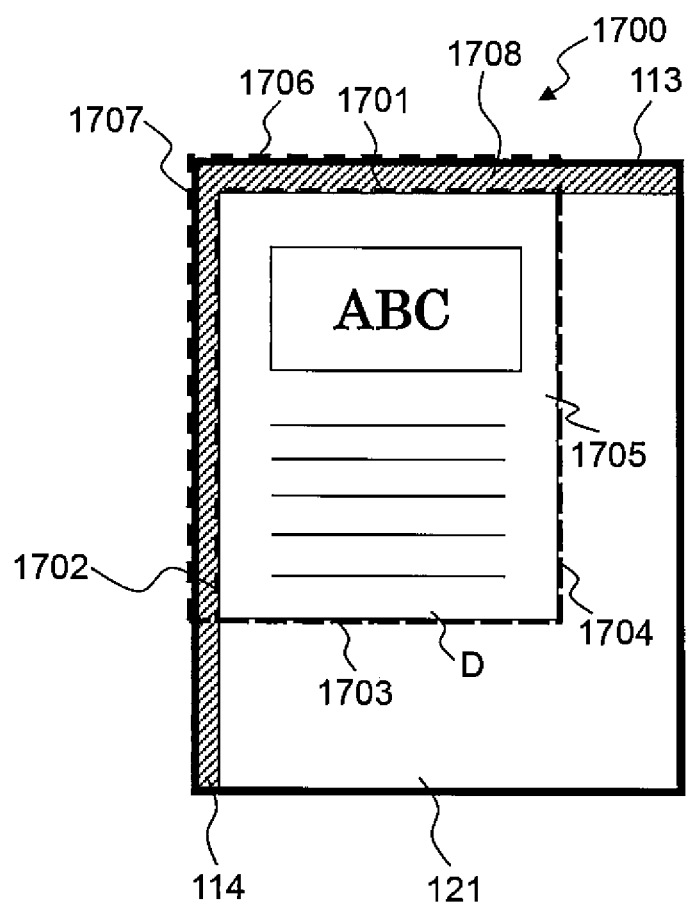
FIG. 17B is a schematic view illustrating an input image 1700.

FIG. 17A is a schematic view of the glass plate 111, as viewed from above, when the reading region R of the imaging device 118a is shifted to the first edge 113 and the second edge 114 and the document D is mounted on the glass plate 111 in contact with the first edge 113 and the second edge 114. FIG. 17B is a schematic view illustrating an input image 1700 captured in the state depicted in FIG. 17A.

In the example illustrated in FIGS. 17A and 17B, the input image 1700 captures the first edge 113 and the second edge 114. However, in this example, a rectangle region 1705 formed by a straight line 1701 defined by the first edge 113, a straight line 1702 defined by the second edge 114, a straight line 1703 defined by the lower end of the document D, and a straight line 1704 defined by the right end of the document D is cut out as a document region. Therefore, a document region is suitably cut out without edge pixel deletion processing and edge pixel addition processing.

Edge pixel deletion processing is performed for the input image 1700 to delete edge pixels defined on the first edge 113 and the second edge 114 and located within the second range of the input image 1700. However, since the background of the document D is captured in the first range of the input image 1700, end pixels defined at the upper end and the left end of the input image 1700 are added as edge pixels by edge pixel addition processing. As a result, a rectangle region 1708 formed by a straight line 1706 defined by the upper end of the input image 1700, a straight line 1707 defined by the left end of the input image 1700, a straight line 1703 defined by the lower end of the document D, and a straight line 1704 defined by the right end of the document D is suitably cut out as a document region.

Figure 18A:
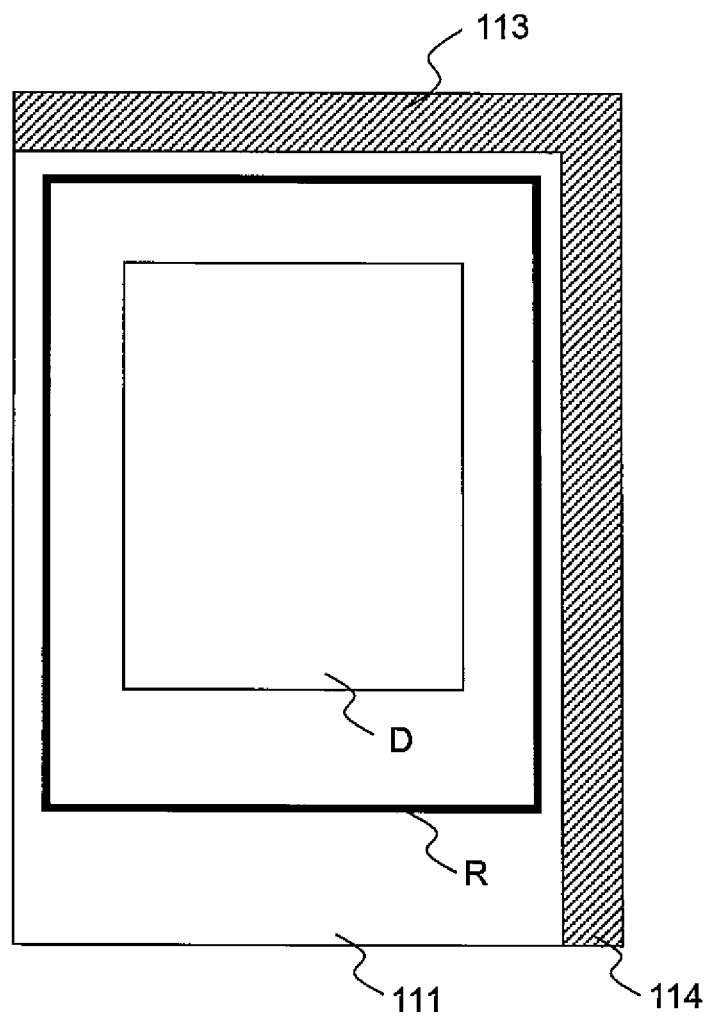
FIG. 18A is a schematic view of a glass plate 111 as viewed from above.
Figure 18B:
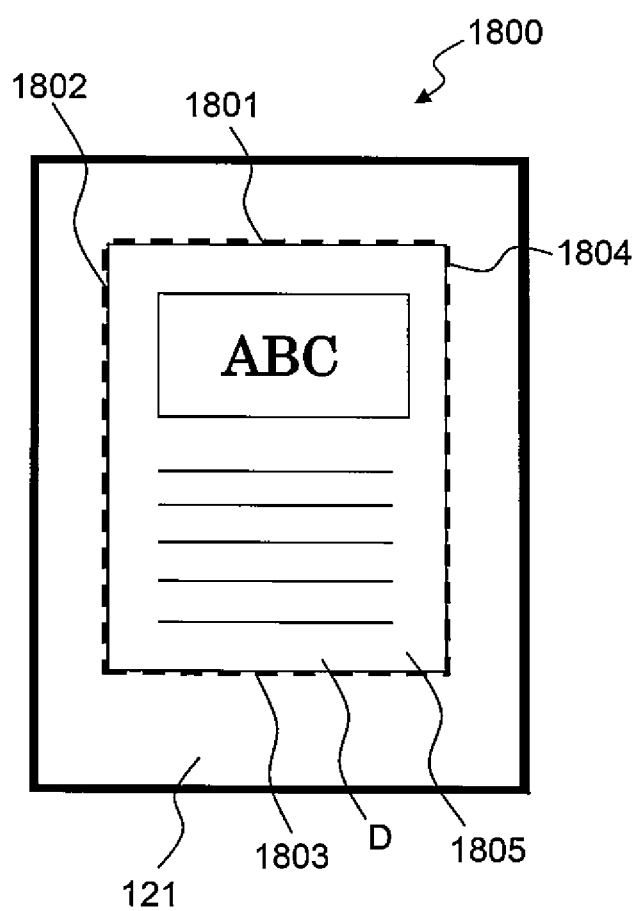
FIG. 18B is a schematic view illustrating an input image 1800.

FIG. 18A is a schematic view of the glass plate 111, as viewed from above, when the reading region R of the imaging device 118a is shifted to the side opposite to the first edge 113 and the second edge 114 and the document D is mounted on the glass plate 111 without contact with the first edge 113 and the second edge 114. FIG. 18B is a schematic view illustrating an input image 1800 captured in the state depicted in FIG. 18A.

In the example illustrated in FIGS. 18A and 18B, a rectangle region 1805 formed by a straight line 1801 defined by the upper end of the document D, a straight line 1802 defined by the left end of the document D, a straight line 1803 defined by the lower end of the document D, and a straight line 1804 defined by the right end of the document D is cut out as a document region. Therefore, a document region is suitably cut out without edge pixel deletion processing and edge pixel addition processing.

Since no edge pixel is located within the second range of the input image 1800, no edge pixel is deleted even when edge pixel deletion processing is performed for the input image 1800. Since the backing member 121 is captured in the first range of the input image 1800, no edge pixel is added even when edge pixel addition processing is performed. Therefore, a rectangle region 1805 formed by a straight line 1801 defined by the upper end of the document D, a straight line 1802 defined by the left end of the document D, a straight line 1803 defined by the lower end of the document D, and a straight line 1804 defined by the right end of the document D is suitably cut out as a document region.

In this manner, edge pixel deletion processing and edge pixel addition processing may be performed to suitably cut out a document region in all of the cases illustrated in FIGS. 15A, 16A, 17A, and 18A.

The first deletion module 254 may determine whether any edge pixel is to be deleted, based on the pixel values of pixels located within the first range from the end pixel. In this case, the first deletion module 254 determines the range of pixel values of pixels which capture the background of the document (which do not capture the backing member 121) in the input image, like the edge pixel addition module 256. The first deletion module 254 determines whether the average of the pixel values of pixels located within the first range from the end pixel falls within the range of pixel values of pixels capturing the background of the document.

When the average falls outside the range, the first deletion module 254 regards the backing member 121 as being captured at the end of the input image, regards an edge pixel closest to the end pixel as an edge pixel corresponding to the first edge 113 or the second edge 114, and deletes the edge pixel. When the average falls within the range, the first deletion module 254 regards the document as being captured at the end of the input image, regards an edge pixel closest to the end pixel as an edge pixel corresponding to the end of the document, and does not delete the edge pixel. Thus, the first deletion module 254 can more accurately delete an edge pixel corresponding to the first edge 113 or the second edge 114.

The information processing apparatus 200 may accept ON/OFF (enabled/disabled) setting of a document cut-out function from the user using the second input device 216. In this case, the information processing apparatus 200 performs the rectangle region detection processing illustrated in FIG. 7 as long as the document cut-out function is enabled, and it directly stores an acquired input image in the second image memory 231 or the second storage device 233 without cutting out a document region from the input image when the document cut-out function is OFF.

Similarly, the information processing apparatus 200 may accept ON/OFF (enabled/disabled) setting of an edge pixel deletion function or an edge pixel addition function from the user using the second input device 216. In this case, the first deletion module 254 performs the edge pixel deletion processing in step S204 of FIG. 7 as long as the edge pixel deletion function is enabled, and omits the edge pixel deletion processing when the edge pixel deletion function is disabled. The edge pixel addition module 256 performs the edge pixel addition processing in step S205 of FIG. 7 as long as the edge pixel addition function is ON, and omits the edge pixel addition processing when the edge pixel addition function is disabled.

In this way, while performing edge pixel addition processing only when the image reading apparatus 100 has an error of the document reading position which hinders the end of the document from being captured in the input image, the information processing apparatus 200 can shorten the processing time when the image reading apparatus 100 has no such error. Further, while performing edge pixel deletion processing only when the image reading apparatus 100 has an error of the document reading position which hinders the first edge 113 or the second edge 114 from being captured in the input image, the information processing apparatus 200 can shorten the processing time when the image reading apparatus 100 has no such error.

As described in detail above, the information processing apparatus 200 can accurately detect a rectangle region from an input image by operation according to the flowcharts illustrated in FIGS. 6, 7, 10, and 12. The information processing apparatus 200 detects a rectangle region based on only information contained in an input image and can therefore detect a rectangle region without special hardware or the like.

The information processing apparatus 200 selects a rectangle region from rectangle region candidates based on the number of edge pixels located within a prescribed distance from each side of each rectangle region candidate, or the likelihood of being a corner of each corner of each rectangle region candidate. Thus, the information processing apparatus 200 can be restrained from detecting an incorrect document region due to the influence of lights or the like even when the document is read while the cover 120 is open.

Figure 19:
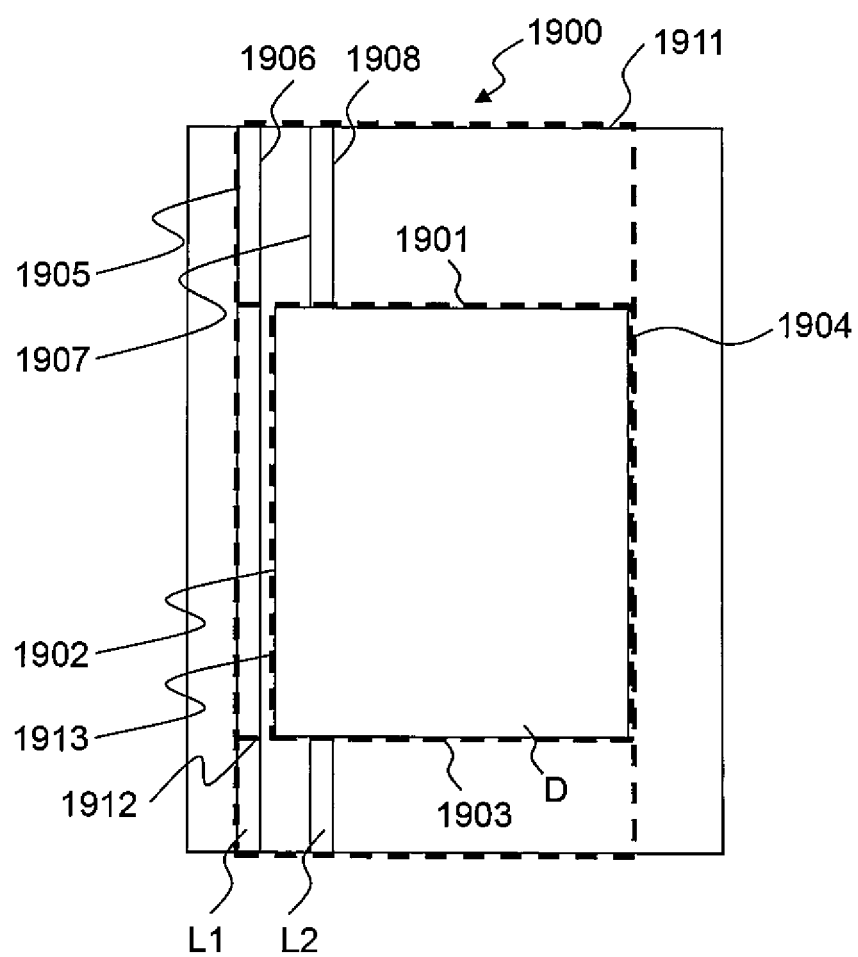
FIG. 19 is a schematic view illustrating an input image 1900.

FIG. 19 is a schematic view illustrating an input image 1900 captured while the cover 120 is open.

When an input image is captured while the cover 120 is closed, the backing member 121 is captured in a region other than the document in the input image and no edge pixel is extracted in the region other than the document. Therefore, the information processing apparatus 200 can appropriately detect a document region without straight line extraction, rectangle region candidate evaluation, or the like by specifying a rectangle region including edge pixels extracted from the input image as a document region.

However, when, for example, a document bound in book form, a stapled document, or a document too voluminous to feed by an ADF is read, the user may read the document while the cover 120 is open to shorten the operation time. As depicted as FIG. 19, when the input image 1900 is captured while the cover 120 is open, the backing member 121 may not be captured and lights L1 and L2 or the like may be captured in a region other than the document D. In this case, not only edge pixels 1901 to 1904 defined on the ends of the document, but also edge pixels 1905 and 1906 defined by the light L1 and edge pixels 1907 and 1908 defined by the light L2 are extracted from the input image 1900. Therefore, when a rectangle region 1911 including the edge pixels 1901 to 1908 extracted from the input image 1900 is set as a document region, the document region includes an image of areas other than the document.

A rectangle region 1912 surrounded by the straight lines 1901 to 1903 defined by the edge pixels at the ends of the document and the straight line 1905 defined by the edge pixel of the light L1 can be detected as a document region by extracting straight lines from edge pixels and detecting a rectangle region from the extracted straight lines. Further, a rectangle region 1913 surrounded by the straight lines 1901 to 1904 defined by the edge pixels at the ends of the document can be detected as a document region by extracting rectangle region candidates from straight lines and selecting a rectangle region based on the evaluation score of each rectangle region candidate.

However, due to the error of the document reading position of the image reading apparatus 100, the input image may not capture the end of the document or may capture the first edge 113 or the second edge 114 of the butting member 112. In this case, straight lines are not appropriately extracted from edge pixels and a rectangle region is not appropriately detected from the extracted straight lines. On the other hand, the information processing apparatus 200 can appropriately extract straight lines and can appropriately detect a rectangle region by appropriately adding or deleting edge pixels by edge pixel addition processing or edge pixel deletion processing.

Figure 20:
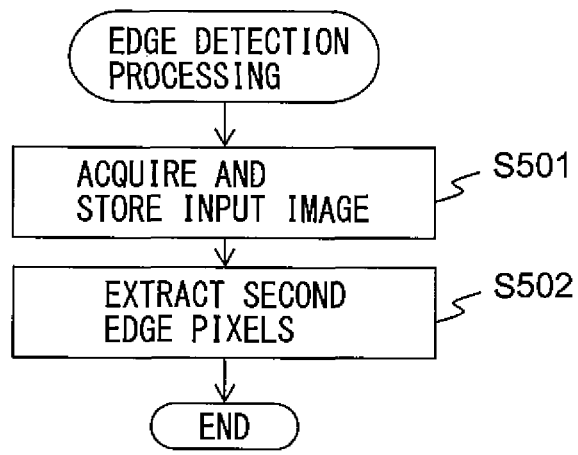
FIG. 20 is a flowchart illustrating an exemplary operation of edge detection processing.

FIG. 20 is a flowchart illustrating an exemplary operation of edge detection processing in another embodiment. The flowchart is executed, for example, at the start of the image reading apparatus 100 in the information processing apparatus 200. The image reading apparatus 100 performs processing according to the flowchart illustrated in FIG. 6 at the start while no document is mounted, and transmits an input image capturing no document to the information processing apparatus 200.

The image input module 251 first acquires an input image capturing no document from the image reading apparatus 100 and stores the input image in the second image memory 231 (step S501), as in step S201 of FIG. 7.

The second deletion module 255 then extracts second edge pixels from the input image capturing no document, as in step S202 of FIG. 7. The second deletion module 255 generates a second edge image from the second edge pixels and stores the second edge image in the second image memory 231 (step S502), and ends a series of steps. Since the input image captures no document, even when any second edge pixels are extracted, the second edge pixels can be considered to be defined by the first edge 113 and the second edge 114 of the butting member 112.

Figure 21:
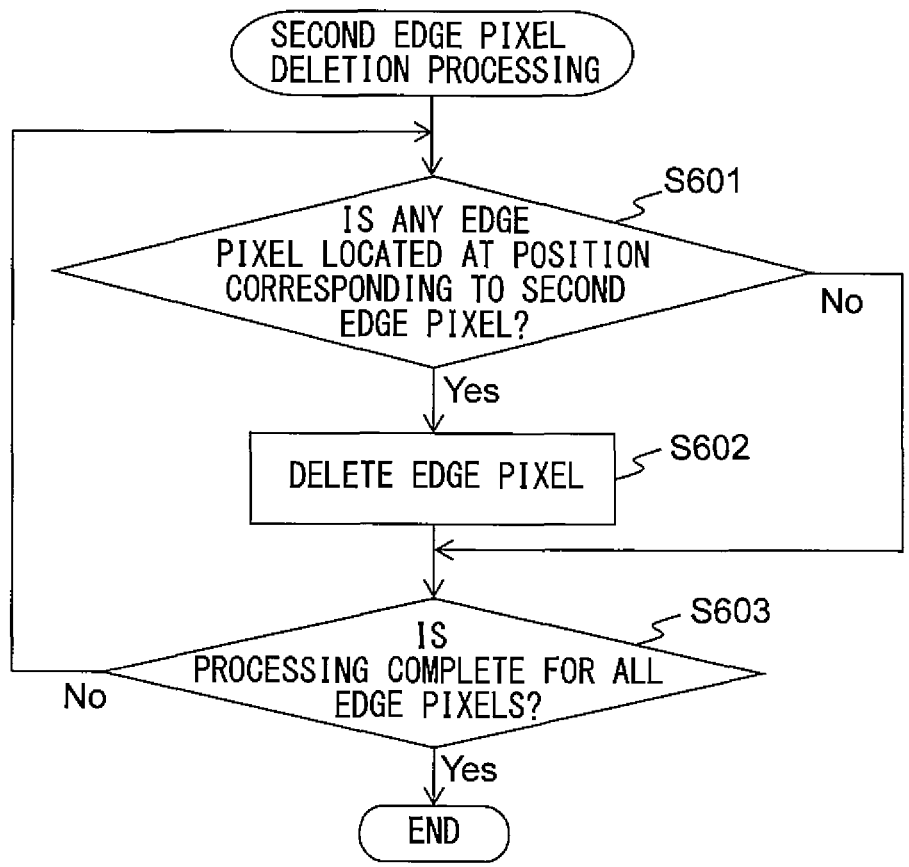
FIG. 21 is a flowchart illustrating an exemplary operation of second edge pixel deletion processing.

FIG. 21 is a flowchart illustrating an exemplary operation of second edge pixel deletion processing as a modification to the edge pixel deletion processing. The flowchart can be executed in the information processing apparatus 200 in place of the flowchart illustrated in FIG. 10. The processes in steps S601 to S603 of FIG. 21 are executed for each edge pixel extracted by the edge pixel extractor 252.

The second deletion module 255 first determines whether any edge pixel is located at a position corresponding to a second edge pixel (step S601). When the position of any edge pixel in the edge image is identical to that of a second edge pixel in the second edge image, the second deletion module 255 determines that the edge pixel is located at a position corresponding to the second edge pixel. When the position of any edge pixel in the edge image falls within a fourth range from the position of a second edge pixel in the second edge image, the second deletion module 255 may determine that the edge pixel is located at a position corresponding to the second edge pixel.

The fourth range is determined based on, for example, the error tolerance occurring in each document reading process in the image reading apparatus 100, especially the sub-scanning magnification. The position at which the first edge 113 and the second edge 114 are captured in a previous captured input image may be separate from that at which the first edge 113 and the second edge 114 are captured in a new captured input image by a distance in the input image corresponding to the sub-scanning magnification. The lower limit value of the fourth range is set to zero, and its upper limit value is set to a distance in the input image corresponding to the sub-scanning magnification. The fourth range may be determined based on the use environmental conditions of the image reading apparatus 100. In this case, the lower limit value of the fourth range is set to zero, and its upper limit value is set to a distance in the input image corresponding to the magnification of vibration which may occur in the image reading apparatus 100.

When any edge pixel is located at a position corresponding to a second edge pixel, the second deletion module 255 regards the edge pixel as an edge pixel corresponding to the first edge 113 or the second edge 114 and deletes the edge pixel (step S602). The second deletion module 255 deletes the edge pixel from the edge image generated by the edge pixel extractor 252. When the position of any edge pixel is different from that corresponding to a second edge pixel, the second deletion module 255 performs no special processing.

The second deletion module 255 determines whether the processing is complete for all edge pixels (step S603). When any edge pixel remains to be processed, the second deletion module 255 returns the process to step S601, in which it repeats the processes in steps S601 to S603. When all edge pixels have been processed, the second deletion module 255 ends a series of steps.

In this manner, the second deletion module 255 deletes an edge pixel located at a position corresponding to a second edge pixel, among the edge pixels extracted by the edge pixel extractor 252. In this case, in step S206 of FIG. 7, the straight line extractor 257 extracts straight lines from edge pixels which are not deleted by the second deletion module 255, among the edge pixels extracted by the edge pixel extractor 252, and the end pixels added as edge pixels by the edge pixel addition module 256.

As described in detail above, the information processing apparatus 200 can accurately detect a rectangle region from an input image even by operation according to the flowcharts illustrated in FIGS. 6, 7, 12, 20, and 21. The information processing apparatus 200 can reliably specify the position of the first edge 113 and the second edge 114 of the butting member 112 and can therefore more accurately detect a rectangle region.

Figure 22:
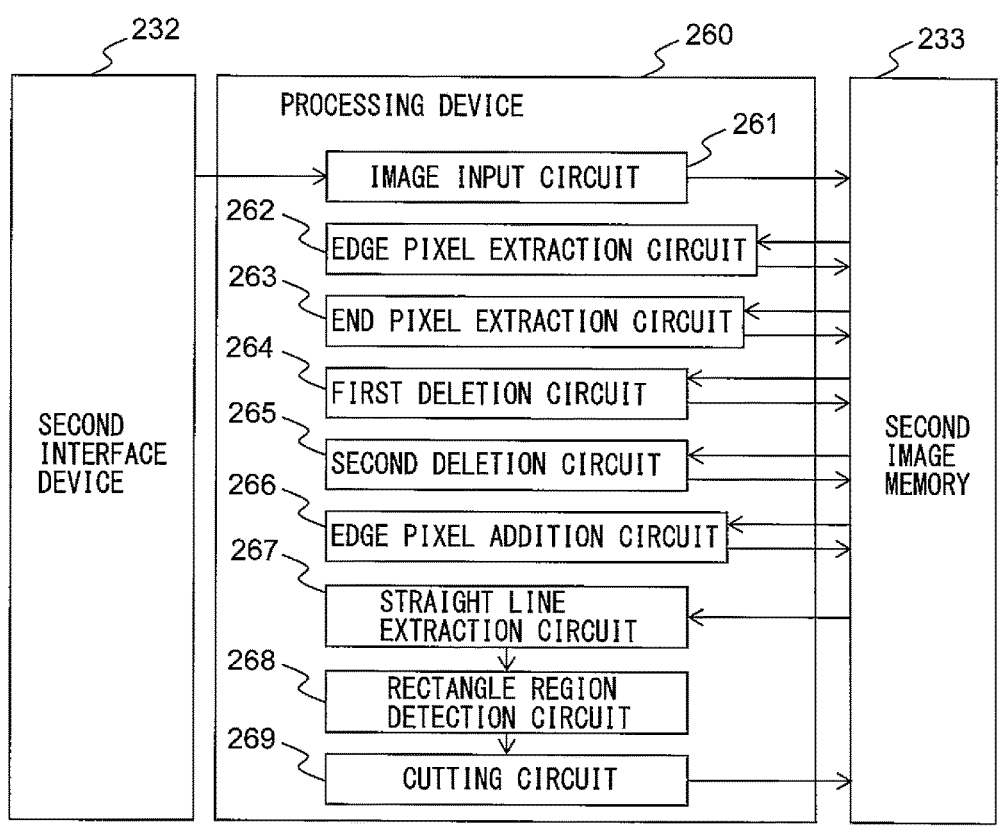
FIG. 22 is a block diagram illustrating the schematic configuration of a processing device 260.

FIG. 22 is a block diagram illustrating the schematic configuration of a processing device 260 in an information processing apparatus according to another embodiment.

The processing device 260 substitutes for the processing device 250 of the information processing apparatus 200 and performs rectangle region detection processing, edge pixel deletion processing, and edge pixel addition processing. The processing device 260 includes, for example, an image input circuit 261, an edge pixel extraction circuit 262, an end pixel extraction circuit 263, a first deletion circuit 264, a second deletion circuit 265, an edge pixel addition circuit 266, a straight line extraction circuit 267, a rectangle region detection circuit 268, and a cutting circuit 269.

The image input circuit 261 is an example of an image input module and has the same function as the image input module 251. The image input circuit 261 acquires an input image from the image reading apparatus 100 via the second interface device 232 and stores the input image in the second image memory 231.

The edge pixel extraction circuit 262 is an example of an edge pixel extractor and has the same function as the edge pixel extractor 252. The edge pixel extraction circuit 262 extracts edge pixels from the input image to generate an edge image formed by the edge pixels and stores the edge image in the second image memory 231.

The end pixel extraction circuit 263 is an example of an end pixel extractor and has the same function as the end pixel extractor 253. The end pixel extraction circuit 263 extracts end pixels in the input image and stores the end pixels in the second image memory 231.

The first deletion circuit 264 is an example of a first deletion module and has the same function as the first deletion module 254. The first deletion circuit 264 performs edge pixel deletion processing.

The second deletion circuit 265 is an example of a second deletion module and has the same function as the second deletion module 255. The second deletion circuit 265 performs second edge pixel deletion processing.

The edge pixel addition circuit 266 is an example of an edge pixel addition module and has the same function as the edge pixel addition module 256. The edge pixel addition circuit 266 performs edge pixel addition processing.

The straight line extraction circuit 267 is an example of a straight line extractor and has the same function as the straight line extractor 257. The straight line extraction circuit 267 extracts straight lines from edge pixels which are not deleted by the first deletion circuit 264 or the second deletion circuit 265, among the edge pixels extracted by the edge pixel extraction circuit 262, and the end pixels added as edge pixels by the edge pixel addition circuit 266.

The rectangle region detection circuit 268 is an example of a rectangle region detector and has the same function as the rectangle region detector 258. The rectangle region detection circuit 268 detects a rectangle region from the straight lines extracted by the straight line extraction circuit 267.

The cutting circuit 269 is an example of a cutting module and has the same function as the cutting module 259. The cutting circuit 269 cuts out the rectangle region detected by the rectangle region detection circuit 268 from the input image as a document region and stores the cut-out image in the second image memory 231 or the second storage device 233.

As described in detail above, the information processing apparatus can accurately detect a rectangle region from an input image even when the processing device 260 is used.

Figure 23:
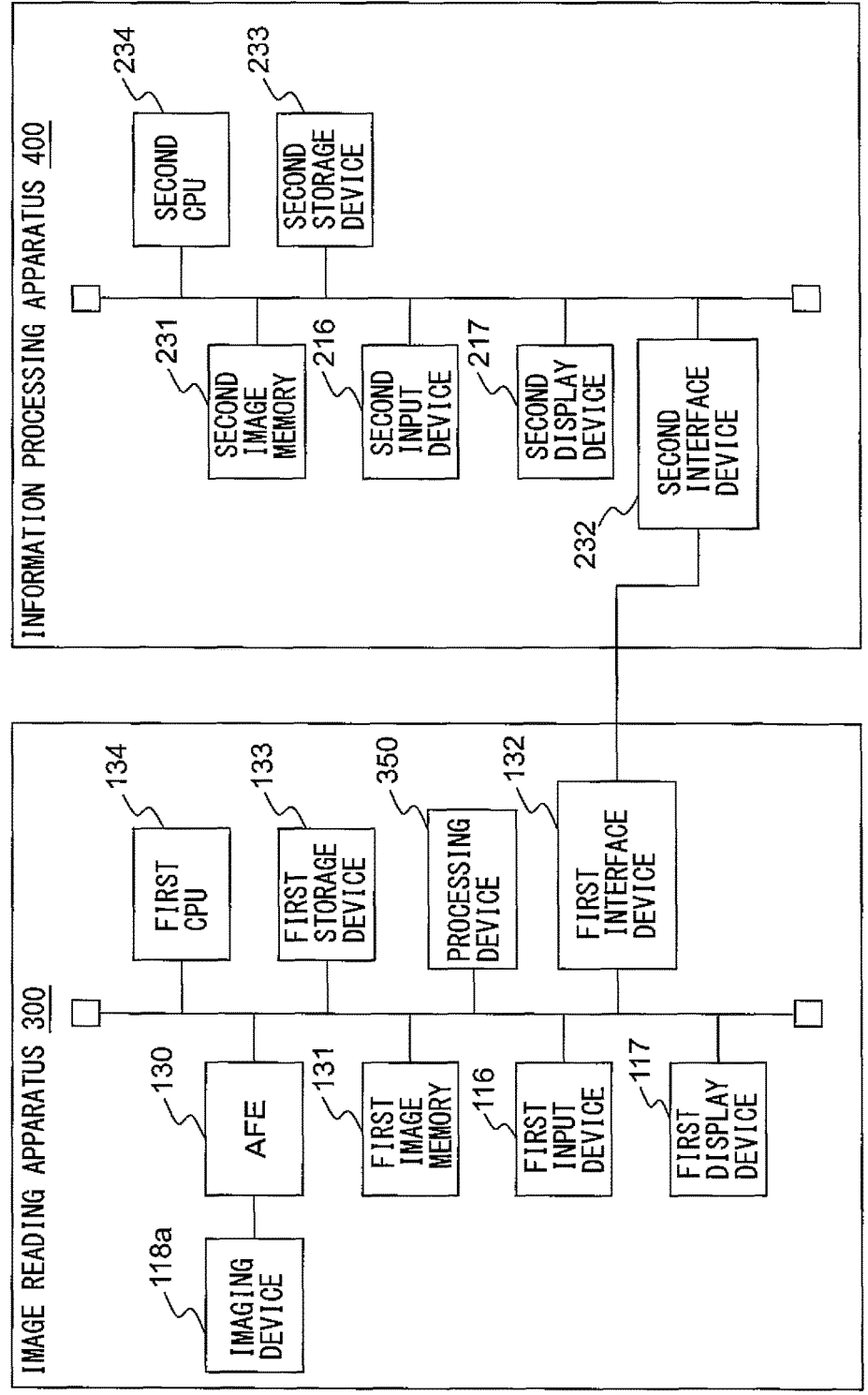
FIG. 23 is a diagram illustrating the schematic configuration of another image processing system 2.

FIG. 23 is a diagram schematically illustrating a configuration of another image processing system 2. The image processing system 2 illustrated in FIG. 23 differs from the image processing system 1 illustrated in FIG. 4 in that a different apparatus includes a processing device. In other words, in the image processing system 2, an image reading apparatus 300, instead of the information processing apparatus 400, includes a processing device 350. The processing device 350 has a function similar to the function of the processing device 250 or the processing device 260 of the information processing apparatus 200. The first storage device 133 stores information stored in the second storage device.

In the image processing system 2 illustrated in FIG. 23, processing substantially the same as the processing illustrated in FIGS. 6, 7, 10, 12, 20 and 21 described previously can be executed. How the image reading processing illustrated in the flowchart of FIG. 6 and the rectangle region detection processing illustrated in the flowchart of FIG. 7 are adapted will be described below. In the image processing system 2, processing at step S101 and processing at steps S202 through S212 are executed primarily by the processing device 350 in cooperation with elements of the image reading apparatus 300 in accordance with a program that has been stored in a first storage device 133 beforehand.

At step S101, the imaging device 118a of the image reading apparatus 300 captures a document, and the AFE 130 generates an input image and stores the input image in the first image memory 131. Since rectangle region detection processing is performed in the image reading apparatus 300, transmission and reception of the read image at steps S102 and S201 are omitted.

Processing at steps S202 through S209, steps S301 through S303, steps S401 through S406, steps S501 through S503, and steps S601 through S603 is executed by the processing device 350 of the image reading apparatus 300. The operation of the processing is the same as the processing executed by the processing device 250 or the processing device 260 of the information processing apparatus 200 described in relation to the image processing system 1. The processing device 350 of the image reading apparatus 300 transmits a cut-out region and a separated image to the information processing apparatus 400 through a first interface device 132.

In this way, the mode in which the image reading apparatus 300 includes the processing device 350 and executes the rectangle region detection processing can achieve the same advantageous effects as the mode in which the information processing apparatus includes the processing device to execute rectangle region detection processing.

While preferred embodiments have been described above, it is not limited to the embodiments. For example, sharing of functions between an image reading apparatus and an information processing apparatus is not limited to the examples of the image processing systems illustrated in FIGS. 4 and 23; the components of the image reading apparatus and the information processing apparatus, including the components in the processing device, can be provided any of the image reading apparatus and the information processing device as appropriate. Alternatively, the image reading apparatus and the information processing apparatus may be configured as a single apparatus.

Furthermore, the first interface device 132 and the second interface device 232 in the image processing system 1, 2 may be interconnected through a network such as the Internet, a telephone network (including a mobile network and a fixed-telephone network) or an intranet. In that case, each of the first interface device 132 and the second interface device 232 is equipped with an interface circuit for connecting to the network. Additionally, in that case, a plurality of information processing apparatuses 200, 400 may be distributed on the network and the information processing apparatuses 200, 400 may cooperate with one another to perform the rectangle region detection processing and other processing in a distributed manner, so that image processing services can be provided in the form of cloud computing. This enables the document rectangle region detection processing to be efficiently performed by the image processing system 1, 2 for input images read by a plurality of image reading apparatuses 100, 300.

According to the image processing apparatus, the rectangle region detection method and the computer-readable, non-transitory medium, it is possible to accurately detect a rectangle region from an input image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus for detecting a rectangle region as an image region in an image comprising:
    an image memory for storing an input image;
    a processor for:
        extracting an edge pixel from an input image based on pixel values of pixels in the input image,
        extracting an end pixel of an end of an image reading area for imaging a document in the input image,
        determining a first range based on an error tolerance of a reading position of an image reading device,
        deleting an edge pixel which is located within a second range from the extracted end pixel and is closest to the end pixel, of the extracted edge pixel,
        adding the extracted end pixel as an edge pixel based on a pixel value of a pixel located within the first range from the end pixel, extracting straight lines from an edge pixel which is not deleted, of the extracted edge pixel and the end pixel added as an edge pixel, detecting a rectangle region from the extracted straight lines as the image region in the input image; and a display for displaying the rectangle region as the image region in the input image.

2. The image processing apparatus according to claim 1, wherein the processor adds the end pixel as the edge pixel when an average of the pixel value of the pixel located within the first range from the end pixel falls within a range determined based on a pixel value of a prescribed pixel in the input image.

3. The image processing apparatus according to claim 1, further comprising a storage for storing an error tolerance of a reading position of the image reading device having captured the input image, wherein the first range is determined based on the error tolerance of the reading position of the image reading device.

4. The image processing apparatus according to claim 1, further comprising a storage for storing an error tolerance of a reading position of the image reading device having captured the input image, wherein the second range is determined based on the error tolerance of the reading position of the image reading device.

5. The image processing apparatus according to claim 1, wherein the processor extracts a second edge pixel from an image capturing no document and deletes an edge pixel located at a position corresponding to the second edge pixel, of the extracted edge pixel, and wherein the processor extracts the straight lines from an edge pixel which is not deleted, of the extracted edge pixel.

6. A method executed by an image processing apparatus for detecting a rectangle region as an image region in an image, the method comprising:

extracting an edge pixel from an input image based on pixel values of pixels in the input image;

extracting an end pixel of an end of an image reading area for imaging a document in the input image;

determining a first range based on an error tolerance of a reading position of an image reading device;

deleting an edge pixel which is located within a second range from the extracted end pixel and is closest to the end pixel, of the extracted edge pixel;

adding the extracted end pixel as an edge pixel based on a pixel value of a pixel located within the first range from the end pixel;

extracting straight lines from an edge pixel which is not deleted, of the extracted edge pixel and the end pixel added as an edge pixel;

detecting a rectangle region from the extracted straight lines as the image region in the input image; and displaying the rectangle region as the image region in the input image on a display.

7. A computer-readable, non-transitory medium storing a computer program, wherein the computer program causes a computer to execute a process for detecting a rectangle region as an image region in an image, the process comprising:

extracting an edge pixel from an input image based on pixel values of pixels in the input image;

extracting an end pixel of an end of an image reading area for imaging a document in the input image;

determining a first range based on an error tolerance of a reading position of an image reading device;

deleting an edge pixel which is located within a second range from the extracted end pixel and is closest to the end pixel, of the extracted edge pixel;

adding the extracted end pixel as an edge pixel based on a pixel value of a pixel located within the first range from the end pixel;

extracting straight lines from an edge pixel which is not deleted, of the extracted edge pixel and the end pixel added as an edge pixel;

detecting a rectangle region from the extracted straight lines as the image region in the input image; and displaying the rectangle region as the image region in the input image on a display.

* * * * *